US012506807B2

United States Patent
Jang et al.

(10) Patent No.: US 12,506,807 B2
(45) Date of Patent: Dec. 23, 2025

(54) ELECTRONIC DEVICE MOUNTED ON VEHICLE AND OPERATION METHOD THEREOF

(71) Applicant: Samsung Electronics Co., Ltd., Suwon-si (KR)

(72) Inventors: Changwon Jang, Suwon-si (KR); Seungjin Yu, Suwon-si (KR); Seungbum Ju, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 424 days.

(21) Appl. No.: 18/168,286

(22) Filed: Feb. 13, 2023

(65) Prior Publication Data
US 2023/0188604 A1 Jun. 15, 2023

Related U.S. Application Data

(63) Continuation of application No. PCT/KR2021/011394, filed on Aug. 25, 2021.

(30) Foreign Application Priority Data
Aug. 26, 2020 (KR) .......................... 10-2020-0108048

(51) Int. Cl.
*H04L 67/12* (2022.01)
*B60R 16/023* (2006.01)
(Continued)

(52) U.S. Cl.
CPC ............ *H04L 67/12* (2013.01); *B60R 16/023* (2013.01); *G06V 10/12* (2022.01); *G06V 10/82* (2022.01);
(Continued)

(58) Field of Classification Search
CPC ..... B60R 16/023; B60R 21/015; B60R 25/31; G06V 10/12; G06V 10/82; G06V 20/593;
(Continued)

(56) References Cited

U.S. PATENT DOCUMENTS 9,390,335 B2 7/2016 Lee
9,866,499 B2 1/2018 Lee
(Continued)

FOREIGN PATENT DOCUMENTS

JP 6265458 B2 1/2018
JP 2020-080490 A 5/2020
(Continued)

OTHER PUBLICATIONS

Korean Notice of Allowance dated Nov. 28, 2024, issued in Korean Patent Application No. 10-2020-0108048.
(Continued)

*Primary Examiner* — Brian J. Gillis
*Assistant Examiner* — Thao D Duong
(74) *Attorney, Agent, or Firm* — Jefferson IP Law, LLP

(57) ABSTRACT

An electronic device mounted on a vehicle and an operating method of the electronic device are provided. The electronic device monitor the number of occupants riding in the vehicle, obtain communication access information includes information about the number of connectors accessing a communication module from among the occupants and information about an amount of data use through the communication module, recognize an operation pattern of the occupants, by using an occupant monitoring system (OMS), predict a data throughput to be transmitted and received through the communication module, by using the number of occupants, the obtained communication access information, and the operation pattern of the occupants, and determine, based on the predicted data throughout, whether to change (Continued)

a first communication scheme in use to a second communication scheme, which is fifth generation (5G) millimeter wave (mmWave) communication.

15 Claims, 13 Drawing Sheets

(51) Int. Cl.
    *G06V 10/12*     (2022.01)
    *G06V 10/82*     (2022.01)
    *G06V 20/59*     (2022.01)
    *H04L 43/0888*     (2022.01)

(52) U.S. Cl.
    CPC .......... *G06V 20/593* (2022.01); *G06V 20/597* (2022.01); *H04L 43/0888* (2013.01)

(58) Field of Classification Search
    CPC .. G06V 20/597; G06V 20/59; H04L 43/0888; H04L 41/147; B60N 2/00
    See application file for complete search history.

(56) References Cited

U.S. PATENT DOCUMENTS

| | | | |
|---|---|---|---|
| 10,755,124 | B2 | 8/2020 | Miyamoto |
| 10,966,123 | B2 | 3/2021 | Baek et al. |
| 11,240,417 | B1* | 2/2022 | Gurganus ............ H04W 36/322 |
| 2008/0004071 | A1 | 1/2008 | Hidaka et al. |
| 2013/0237220 | A1 | 9/2013 | Lee et al. |
| 2017/0230873 | A1* | 8/2017 | Baek ................. H04W 36/1443 |
| 2018/0376348 | A1* | 12/2018 | Moravapalle ......... H04W 28/18 |
| 2019/0104507 | A1* | 4/2019 | Majmundar .......... H04W 36/06 |
| 2019/0147262 | A1* | 5/2019 | Kuehnle .......... G06Q 10/06398 340/439 |
| 2019/0288877 | A1* | 9/2019 | Babbellapati ........... H04L 47/22 |
| 2019/0392256 | A1 | 12/2019 | Cho |
| 2020/0068468 | A1 | 2/2020 | Gronstad et al. |
| 2020/0351205 | A1* | 11/2020 | Filley ..................... G08G 1/012 |
| 2021/0179117 | A1* | 6/2021 | Glazman ............. B60R 21/0136 |
| 2021/0211900 | A1* | 7/2021 | Pius ...................... H04W 24/08 |
| 2022/0150721 | A1* | 5/2022 | Zebulon ................ H04L 1/0015 |
| 2023/0230114 | A1* | 7/2023 | Anderson .......... G06Q 30/0205 705/7.34 |

FOREIGN PATENT DOCUMENTS

| | | | |
|---|---|---|---|
| KR | 10-2013-0102323 A | | 9/2013 |
| KR | 10-1520568 B1 | | 5/2015 |
| KR | 10-2015-0067018 A | | 6/2015 |
| KR | 10-1595944 B1 | | 2/2016 |
| KR | 10-1602250 B1 | | 3/2016 |
| KR | 10-2017-0093046 A | | 8/2017 |
| KR | 10-2019-0088649 A | | 7/2019 |
| KR | 10-2019-0096866 A | | 8/2019 |
| KR | 10-2085645 B1 | | 3/2020 |
| WO | 2011/022095 A1 | | 2/2011 |
| WO | 2017/158647 A1 | | 11/2018 |
| WO | 2019/048384 A1 | | 3/2019 |

OTHER PUBLICATIONS

International Search Report dated Dec. 10, 2021, issued in International Patent Application No. PCT/KR2021/011394.

* cited by examiner

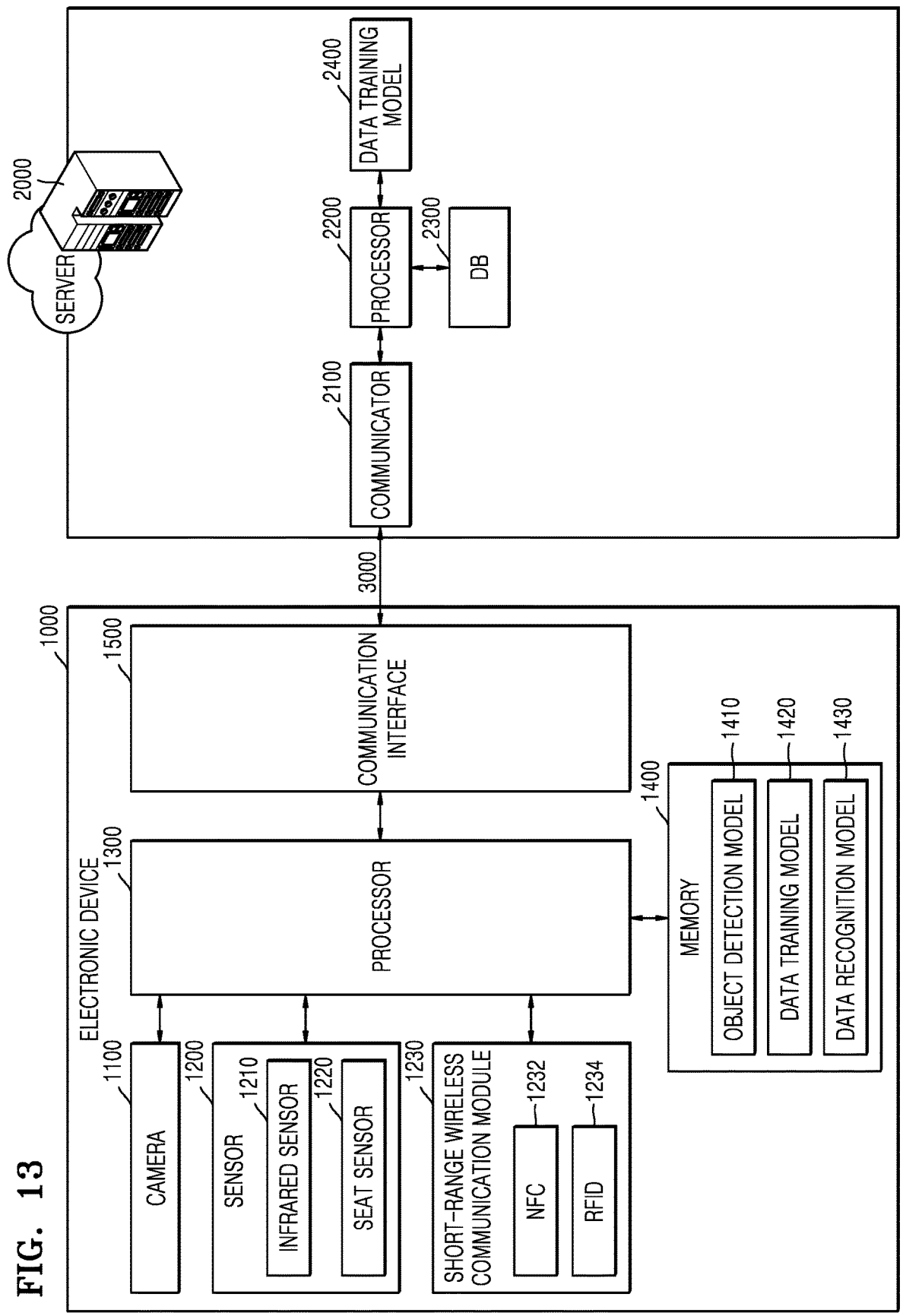

ELECTRONIC DEVICE MOUNTED ON VEHICLE AND OPERATION METHOD THEREOF

CROSS-REFERENCE TO RELATED APPLICATION(S)

This application is a continuation application, claiming priority under § 365(c), of an International application No. PCT/KR2021/011394, filed on Aug. 25, 2021, which is based on and claims the benefit of a Korean patent application number 10-2020-0108048, filed on Aug. 26, 2020, in the Korean Intellectual Property Office, the disclosure of which is incorporated by reference herein in its entirety.

BACKGROUND

1. Field

The disclosure relates to an electronic device mounted on a vehicle and an operating method thereof. More particularly, the disclosure relates to an electronic device for selecting a communication scheme and a method, performed by the electronic device, of selecting the communication scheme.

2. Description of Related Art

Recently, vehicle to everything (V2X) communication for transmitting and receiving data through a wired or wireless communication network has been used with respect to vehicles. The V2X communication requires low latency and a high data transmission speed for data transmission and reception for autonomous driving of a vehicle, high-resolution map data (e.g., a high definition (HD) map), an update of an operating system of a vehicle based on an over the air (OTA) scheme, and the like. In particular, for autonomous driving of the vehicle, data has to be transmitted and received in real time to and from a camera, a light detection and radar (LIDAR) sensor, other radars, or a server, in order to increase a recognition rate of an ambient condition, such as a road on which the vehicle is driven or an ambient vehicle. Thus, a high data transmission rate and low latency are required.

To implement the high data transmission rate and the low latency, the V2X communication uses fifth generation (5G) mobile communication. Requirements of the 5G mobile communication include a high data transmission rate (an enhanced mobile broadband (eMBB)), ultra-low latency (ultra-reliable low latency communications (URLLC)), a capacity to process a great number of devices (enhanced machine type communications (eMTC)), high reliability and energy efficiency, and the like. To satisfy these requirements, the V2X communication implements a 5G radio access network (RAN) system adopting a millimeter wave (mmWave)-based radio access technique.

In comparison with a 5G Sub 6 communication band that is less than or equal to 6 gigahertz (GHz), a 5G mmWave frequency band that is recently used in a vehicle is 28 GHz to 100 GHz, with respect to which a continuous wide bandwidth is available. However, in the case of a 5G mmWave communication scheme, there are limits, such as a narrow service area due to a short radio wave reaching-distance according to a characteristic of a shape of a beam, hindrance or blockage of radio waves due to an obstacle, or limited mobility support and data transmission reliability. Also, when the 5G mmWave communication scheme is continually used, power consumption and a heating problem may occur, and thus, it is inefficient for an electronic device mounted on a vehicle to use the 5G mmWave communication scheme by configuring the 5G mmWave communication scheme as a default communication scheme.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for predicting the amount of data use of occupants according to the number of occupants and states of the occupants and determining, based on a result of the predicting, whether to use a fifth generation (5G) millimeter wave (mmWave) communication scheme or other communication schemes, and an operating method of the electronic device.

Additional aspects will be set forth in part in the description which follows and, in part, will be apparent from the description, or may be learned by practice of the presented embodiments.

In accordance with an aspect of the disclosure, an operating method of an electronic device mounted on a vehicle is provided. The operating method includes monitoring a number of occupants riding in the vehicle, obtaining communication access information including information about a number of connectors from among the occupants, the connectors accessing a communication module included in the electronic device, and information about a use amount of data transmitted and received to and from a base station through the communication module, recognizing an operation pattern of the occupants, by using an occupant monitoring system (OMS), predicting a data throughput to be transmitted and received through the communication module, by using the number of occupants, the obtained communication access information, and the operation pattern of the occupants, and determining, based on the predicted data throughput, whether to change a first communication scheme in use to a second communication scheme, which is fifth generation (5G) millimeter wave (mmWave) communication.

According to an embodiment, the monitoring of the number of occupants may include monitoring the number of occupants by counting human beings getting on or off the vehicle, by using at least one of an infrared sensor, near-field communication (NFC), and radio frequency identification (RFID).

According to an embodiment, the monitoring of the number of occupants may include obtaining an occupant image by capturing, by using a camera, the occupants riding in the vehicle, and detecting the occupants from the occupant image via image processing or by using an object detection model, and counting a number of detected occupants.

According to another embodiment, the monitoring of the number of occupants may include recognizing whether a seat is seated, by using a pressure sensor included in the seat of the vehicle and counting the number of occupants based on a result of the recognizing of whether the seat is seated.

According to another embodiment, the recognizing of the operation pattern of the occupants may include obtaining an occupant image by capturing, by using a camera, the occupants riding in the vehicle, and recognizing the operation pattern of the occupants from the occupant image by using a deep neural network (DNN) model including a pre-trained model parameter.

According to another embodiment, the recognizing of the operation pattern of the occupants may include recognizing the operation pattern in which the occupants use a mobile device.

According to another embodiment, the DNN model may be an artificial intelligence (AI) model obtained by training by applying a plurality of pre-obtained images as an input and applying a label value with respect to the operation pattern as an output.

According to another embodiment, the determining of whether to change the first communication scheme may include comparing the predicted data throughput with a predetermined threshold value, and determining, based on a result of the comparing, whether to maintain the first communication scheme or change the first communication scheme to the second communication scheme.

According to another embodiment, the determining of whether or not to change the first communication scheme may include, when, based on the result of the comparing, the predicted data throughput is less than or equal to the predetermined threshold value, determining to continually use the first communication scheme to perform data transmission and reception, wherein the first communication scheme may include any one of 5G Sub 6, long term evolution (LTE), and a third generation (3G) communication scheme.

According to another embodiment, the determining of whether to change the first communication scheme may include, when, based on the result of the comparing, the predicted data throughput exceeds the predetermined threshold value, determining to change the first communication scheme to the second communication scheme, and the method may further include transmitting and receiving data by using the changed second communication scheme.

In accordance with another aspect of the disclosure, an electronic device mounted on a vehicle is provided. The electronic device includes a camera configured to obtain an occupant image by capturing occupants riding in the vehicle, a sensor configured to count a number of occupants by detecting a number of human beings getting on or off the vehicle, a communication interface configured to perform data transmission and reception by using a predetermined first communication scheme, a memory storing a program including one or more instructions to control the electronic device, and at least one processor configured to execute the one or more instructions of the program stored in the memory to monitor the number of occupants riding in the vehicle, by using the occupant image and information obtained by the sensor, obtain communication access information including information about a number of connectors accessing the communication interface and information about a use amount of data transmitted and received to and from a base station through the communication interface, recognize an operation pattern of the occupants, by using an occupant monitoring system (OMS), predict a data throughput to be transmitted and received through the communication interface, by using the number of occupants, the obtained communication access information, and the operation pattern of the occupants, and determine, based on the predicted data throughout, whether or not to change a first communication scheme in use to a second communication scheme, which is fifth generation (5G) millimeter wave (mmWave) communication.

According to an embodiment, the at least one processor may further be configured to execute the one or more instructions of the program stored in the memory to obtain the occupant image from the camera, detect the occupants from the occupant image via image processing or by using an object detection model, and count a number of detected occupants.

According to an embodiment, the electronic device may further include a pressure sensor included in a seat of the vehicle and configured to recognize whether the seat is seated, and the at least one processor may further be configured to execute the one or more instructions of the program stored in the memory to count the number of occupants, based on a result of the recognizing, via the pressure sensor, of whether the seat is seated.

According to an embodiment, the at least one processor may further be configured to execute the one or more instructions of the program stored in the memory to recognize the operation pattern of the occupants from the occupant image by using a deep neural network (DNN) model including a pre-trained model parameter.

According to an embodiment, the at least one processor may further be configured to execute the one or more instructions of the program stored in the memory to recognize, by using the DNN model, the operation pattern in which the occupants use a mobile device.

According to an embodiment, the DNN model may be an artificial intelligence (AI) model obtained by training by applying a plurality of pre-obtained images as an input and applying a label value with respect to the operation pattern as an output.

According to an embodiment, the at least one processor may further be configured to execute the one or more instructions of the program stored in the memory to compare the predicted data throughput with a predetermined threshold value and determine, based on a result of the comparing, whether to maintain the first communication scheme or change the first communication scheme to the second communication scheme.

According to an embodiment, the at least one processor may further be configured to execute the one or more instructions of the program stored in the memory to, when, based on the result of the comparing, the predicted data throughput is less than or equal to the predetermined threshold value, determine to continually use the first communication scheme to perform data transmission and reception, wherein the first communication scheme may include any one of 5G Sub 6, long term evolution (LTE), and a third generation (3G) communication scheme.

According to an embodiment, the at least one processor may further be configured to execute the one or more instructions of the program stored in the memory to, when, based on the result of the comparing, the predicted data throughput exceeds the predetermined threshold value, determine to change the first communication scheme to the second communication scheme, and control the communication interface to transmit and receive data by using the changed second communication scheme.

In accordance with another aspect of the disclosure, a computer program product including a computer-readable storage medium having recorded thereon a program to be executed on a computer is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 13 is a diagram for describing FIG. 12 in detail according to an embodiment of the disclosure.

Throughout the drawings, like reference numerals will be understood to refer to like parts, components, and structures.

DETAILED DESCRIPTION

Figure 1:
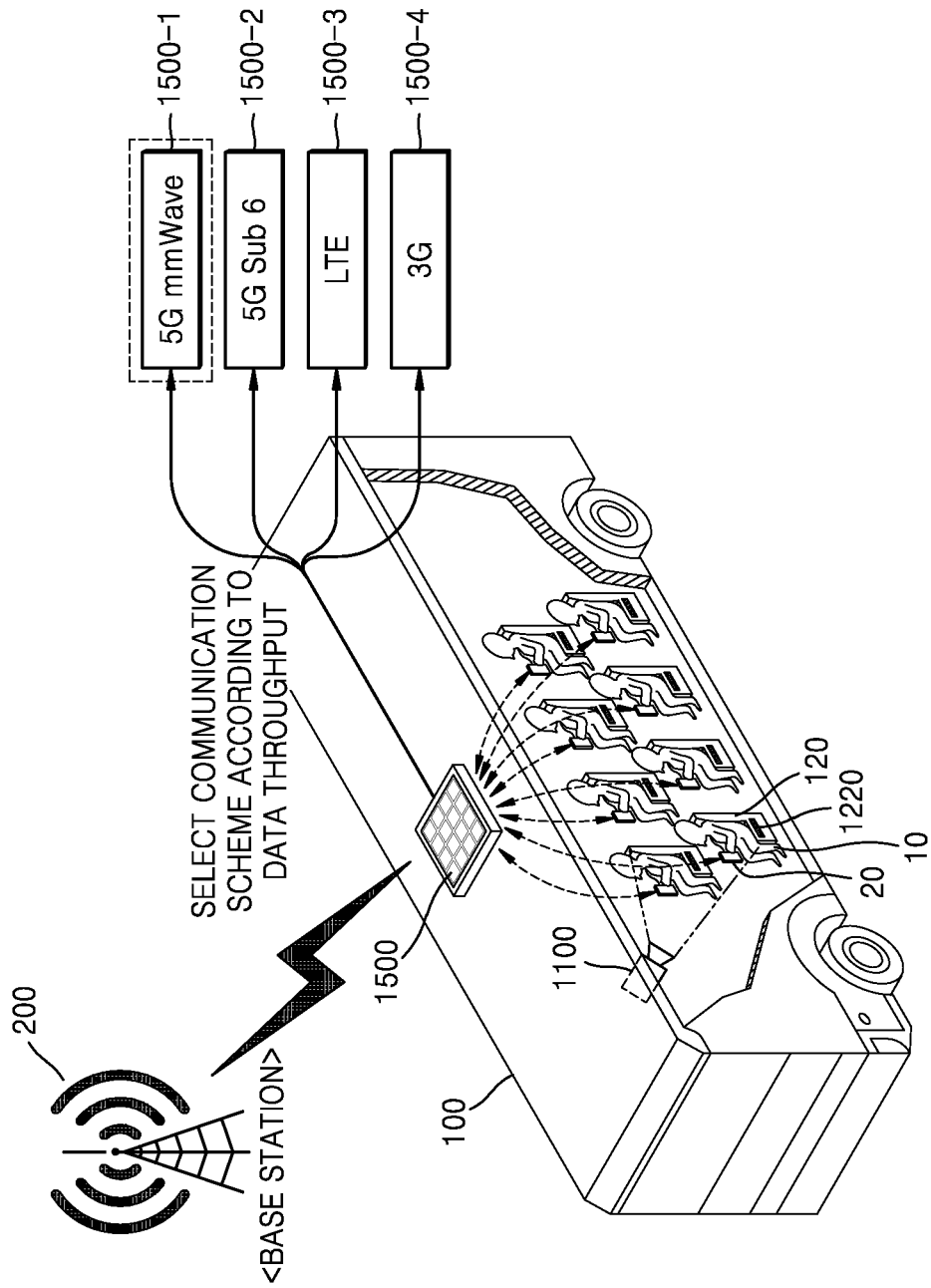
FIG. 1 is a conceptual diagram for describing an operating method of an electronic device, according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the embodiments of the specification, general terms that have been widely used nowadays are selected, when possible, in consideration of functions of the disclosure, but non-general terms may be selected according to the intentions of technicians in the art, precedents, or new technologies, etc. Also, some terms may be arbitrarily chosen by the applicant. In this case, the meanings of these terms will be explained in corresponding parts of an embodiment of the disclosure in detail. Thus, the terms used herein should be defined not based on the names thereof but based on the meanings thereof and the whole context of the disclosure.

An expression used in the singular may encompass the expression in the plural, unless it has a clearly different meaning in the context. Terms used herein, including technical or scientific terms, may have the same meaning as commonly understood by one of ordinary skill in the art described in the disclosure.

Throughout the disclosure, it will be understood that when an element is referred to as "including" another element, the element may further include other elements unless mentioned otherwise. Also, the term, such as "unit" or "module," used in the specification, refers to a unit that processes at least one function or operation, and this may be implemented by hardware, software, or a combination of hardware and software.

The expression "configured to (or set to)" used in this specification may be interchangeably used according to situations, for example, with an expression, "suitable for," "having the capacity to," "designed to," "adapted to," "made to," or "capable of." The term "configured to (or set to)" may not necessarily denote only "specifically designed to" in terms of hardware. Instead, in certain situations, the expression "a system configured to" may denote that the system "has the capacity" to perform certain operations with other devices or components. For example, the phrase "a processor formed to (or configured to) perform A, B, and C" may denote a dedicated processor (e.g., an embedded processor) for performing corresponding operations or a general-purpose processor (e.g., a central processing unit (CPU) or an application processor) capable of performing the corresponding operations by executing one or more software programs stored in a memory.

FIG. 1 is a conceptual diagram for describing an operating method of an electronic device, according to an embodiment of the disclosure.

In detail, FIG. 1 is a diagram illustrating an embodiment in which an electronic device 1000 mounted on a vehicle 100 predicts a data throughput according to a number of occupants and states of the occupants and selects, based on the predicted data throughput, a communication scheme.

Referring to FIG. 1, the electronic device 1000 may be mounted on an external structure of the vehicle 100 or in the external structure. According to the embodiment illustrated in FIG. 1, the electronic device 1000 may be arranged on each of metal structures included in a roof of the vehicle 100.

According to the embodiment illustrated in FIG. 1, the vehicle 100 may be a public transportation vehicle or a commercial vehicle in which a plurality of occupants 10 may ride. The vehicle 100 may be, for example, a bus, a van, or a truck, but is not limited thereto. According to another embodiment, the vehicle 100 may be a three-seat to five-seat car.

The electronic device 1000 may be connected to a base station 200 and may include a communication interface 1500 configured to perform data transmission and reception with the base station 200. According to another embodiment, the communication interface 1500 may include an antenna module for wireless data communication with the base station 200. According to another embodiment, the communication interface 1500 may be wirelessly connected with a mobile device 20 carried by the occupants 10 riding in the vehicle 100 and may be configured to perform a communication relay function relaying communication between the base station 200 and the mobile device 20 of the occupants 10.

The electronic device 1000 may include a camera 1100 and a sensor 1200 (see FIG. 2) in addition to the communication interface 1500.

The camera 1100 may be configured to obtain an occupant image by capturing the occupants 10 riding in the vehicle 100. FIG. 1 illustrates that the number of cameras 1100 is one, but the disclosure is not limited thereto. According to an embodiment, the camera 1100 may be arranged in the vehicle 100 in a plural number. The camera 1100 may be arranged in or adjacent to, for example, at least one of a front window, a rear-view mirror 510 (see FIG. 5), a gauge, a cluster display, and a steering wheel. An arrangement structure of the camera 1100 is to be described in detail with reference to FIG. 5.

Figure 2:
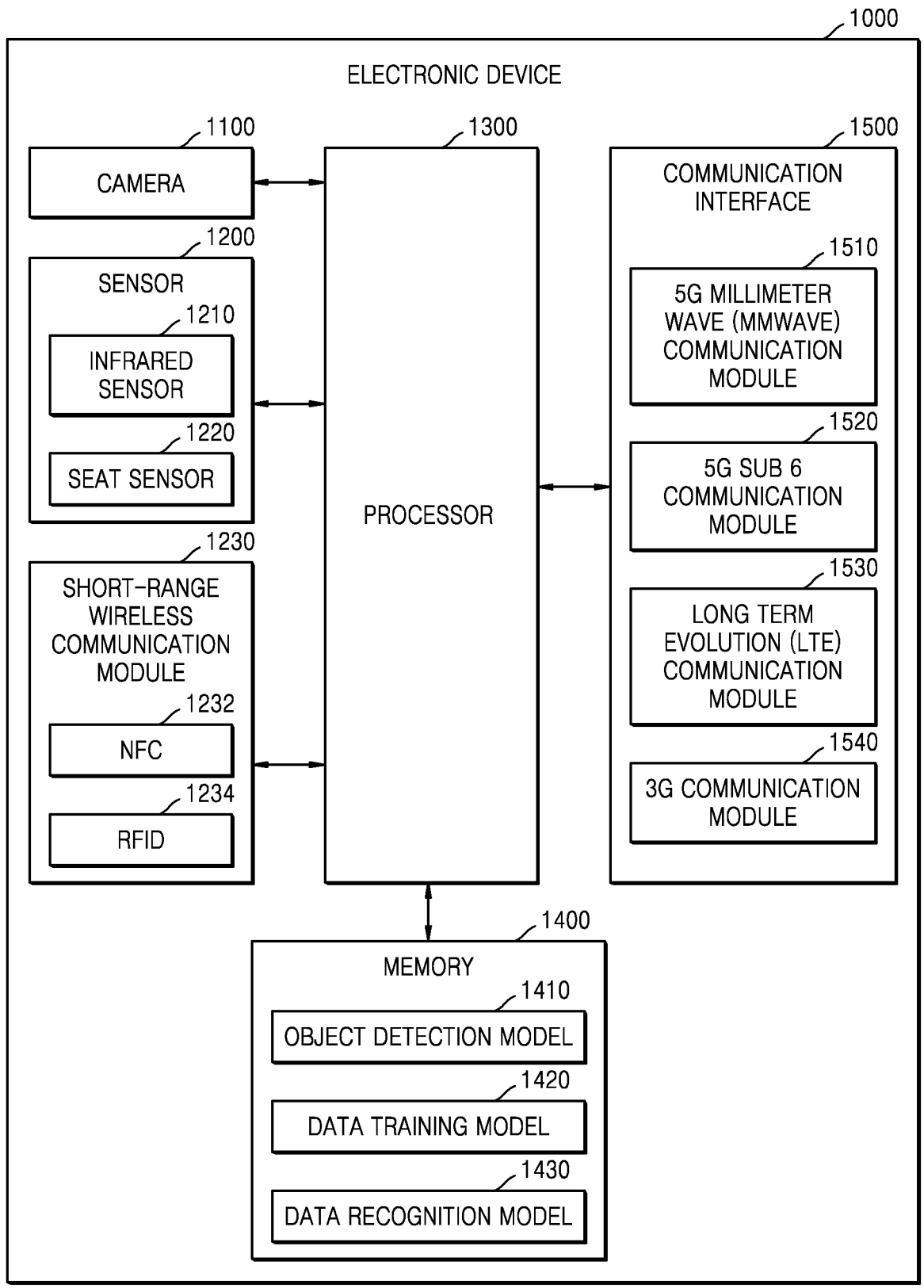
FIG. 2 is a block diagram showing components of an electronic device according to an embodiment of the disclosure.

The electronic device 1000 may detect the occupants 10 from the occupant image, by using an object detection model 1410 (see FIG. 2). According to another embodiment, the electronic device 1000 may detect a face of the occupants 10 from the occupant image, by using a well-known image processing algorithm. However, the disclosure is not limited thereto. The electronic device 1000 may detect the occupants 10 from the occupant image, by using an artificial intelligence (AI) model based on machine-learning, such as a deep neural network (DNN), etc.

The electronic device 1000 may count the number of occupants 10 detected from the occupant image. Also, according to an embodiment, the electronic device 1000 may count the number of occupants 10 by using the sensor 1200 (see FIG. 2). According to another embodiment, the sensor 1200 may include an infrared sensor 1210 (see FIG. 2) and a seat sensor 1220.

The infrared sensor 1210 may detect the occupants by using infrared rays and may count the number of detected occupants. The infrared sensor 1210 may be arranged, for example, adjacent to a door of the vehicle 100 and may count the number of occupants by tracking the number of persons getting on or off the vehicle 100 through the door.

According to another embodiment, the electronic device 1000 may determine whether the occupants 10 are seated through the seat sensor 1220 arranged in a seat 120 of the vehicle 100 and may count the number of occupants 10 based on whether the occupants 10 are seated. For example, the seat sensor 1220 is configured as a pressure sensor.

According to another embodiment, the electronic device 1000 may count the number of occupants by tracking the persons getting on or off the vehicle 100, through a near-field communication (NFC) tag, radio frequency identification (RFID), or the like.

The electronic device 1000 may obtain information about the number of connectors from among the occupants 10, the connectors accessing the communication interface 1500, and a use amount of data transmitted and received to and from the base station 200 through the communication interface 1500.

The electronic device 1000 may recognize an operation pattern of the occupants 10, by using an occupant monitoring system (OMS). According to an embodiment, the OMS may include a camera and a DNN model including a pre-trained model parameter, and the electronic device 1000 may recognize the operation pattern of the occupants 10 from the occupant image by using the DNN model. The electronic device 1000 may recognize, for example, an operation pattern in which the occupants 10 use the mobile device 20, an operation pattern in which the occupants 10 gaze at the mobile device 20, an operation pattern in which the occupants 10 take a nap, or an operation pattern in which the occupants 10 converse with a person next to them. An embodiment in which the electronic device 1000 recognizes an operation pattern of the occupants 10 by using the OMS is to be described in detail with reference to FIGS. 7 to 10.

The electronic device 1000 may predict a data throughput through the communication interface 1500, by using the number of occupants, the information about the number of connectors accessing the communication interface 1500, the information about the use amount of data transmitted and received to and from the base station 200 through the communication relay function of the communication interface 1500, and information about the operation pattern of the occupants 10 recognized through the OMS. For example, the electronic device 1000 predicts the data throughput by taking into account the number of connectors currently connected through the communication interface 1500, information about a current amount of data use, and the operation pattern of the occupants 10 using the mobile device 20.

The electronic device 1000 may perform data transmission and reception with the base station 200 by selecting any one of a plurality of communication schemes by comparing the predicted data throughput with a predetermined threshold value. According to another embodiment, the electronic device 1000 may select any one communication scheme form among communication schemes including at least one of a 5G mmWave communication scheme 1500-1, 5G Sub 6 1500-2, long term evolution (LTE) 1500-3, and $3^{rd}$ generation (3G) mobile communication 1500-4. According to another embodiment, the electronic device 1000 may configure a default setting of a wireless network to perform data transmission and reception by using a communication scheme including at least one of the 5G Sub 6 1500-2, the LTE 1500-3, and the 3G mobile communication 1500-4, and may switch to the 5G mmWave communication scheme 1500-1 only when the predicted data throughput exceeds the predetermined threshold value. The predetermined threshold value may be, for example, a maximum data throughput of the 5G Sub 6 communication scheme 1500-2, but it is not limited thereto.

The electronic device 1000 may transmit and receive data to and from the base station 200 by using the selected communication scheme and may transmit and receive data to and from the mobile device 20 by using a device-to-device (D2D) scheme. For example, the electronic device 1000 performs connection with the mobile device 20 through at least one of communication schemes including wireless fidelity (Wifi) direct, mobile Bluetooth, LTE-D2D, and 5G D2D and may transmit and receive data to and from the mobile device 20.

Recent vehicle to everything (V2X) communication uses a 5G mmWave communication scheme, which is capable of realizing a high data transmission rate (enhanced Mobile Broadband (eMBB)), ultra-low latency (URLLC), a capacity to process a large number of devices (enhanced Machine-Type Communication (eMTC)), ultra-high reliability, etc., for data transmission and reception for autonomous driving of the vehicle 100, high-resolution map data (e.g., a high-definition (HD) map), or an update of a vehicle operating system (OS) based on an over the air (OTA) scheme. When the electronic device 1000 mounted on the vehicle 100 uses a 5G mmWave communication scheme, a high data transmission rate and low latency may be realized, but due to short radio wave reach due to a narrow beam characteristic based on a high bandwidth, a service area may be reduced, radio waves may be hindered or blocked due to obstacles, or a mobility support may be limited. Also, when the electronic device 1000 continually uses the 5G mmWave communication scheme, power consumption may be increased, and a heating problem may occur. Thus, it is inefficient for the electronic device 1000 to use the 5G mmWave communication scheme as a default setting of the wireless network.

The electronic device 1000 according to an embodiment of the disclosure may monitor the number of occupants 10, may predict a data throughput by taking into account the number of connectors accessing the communication interface 1500 from among the occupants 10, a current use amount of data transmitted and received through the communication interface 1500, and an operation pattern of the occupants 10 recognized by the OMS, and may determine, based on the predicted data throughput, whether to use the 5G mmWave communication scheme 1500-1 or to use the 5G Sub 6 1500-2, the LTE 1500-3, or the 3G mobile communication 1500-4 having relatively low bandwidths. When the data throughput is predicted to be less than a threshold value, the electronic device 1000 according to the disclosure may use the 5G Sub 6 1500-2, the LTE 1500-3, or the 3G mobile communication 1500-4, and only when the data throughput is predicted to be greater than the threshold value, the electronic device 1000 may use the 5G mmWave communication scheme 1500-1 to transmit and receive data to and from the base station 200, in order to reduce power consumption and prevent the heating problems in advance. That is, according to an embodiment of the disclosure, the communication scheme may be adaptively switched according to the data throughput based on the occupants, and thus, while the advantage of the 5G mmWave communication scheme 1500-1 may be maintained, power consumption may be reduced when the 5G mmWave communication scheme 1500-1 is not used, thereby improving the efficiency and solving the heating problem.

FIG. 2 is a block diagram showing components of the electronic device 1000 according to an embodiment of the disclosure.

The electronic device 1000 may be mounted on an external structure of the vehicle 100 (see FIG. 1). According to an embodiment, the electronic device 1000 may be arranged on a metal structure included in a roof of the vehicle 100. However, the disclosure is not limited thereto, and the electronic device 1000 may also be arranged on a bonnet, a bumper, or a pillar, or in a trunk of the vehicle 100.

Referring to FIG. 2, the electronic device 1000 may include the camera 1100, the sensor 1200, a short-range wireless communication module 1240, a processor 1300, a memory 1400, and the communication interface 1500. The camera 1100, the sensor 1200, the short-range wireless communication module 1240, the processor 1300, the memory 1400, and the communication interface 1500 may be electrically and/or physically connected with each other. The components of FIG. 2 are only illustrated according to an embodiment of the disclosure, and components included in the electronic device 1000 are not limited to the components illustrated in FIG. 2. The electronic device 1000 may not include some of the components illustrated in FIG. 2 and may further include components not illustrated in FIG. 2.

The camera 1100 may capture an occupant boarding the vehicle 100 (see FIG. 1) and obtain an occupant image in real time. According to another embodiment, the camera 1100 may capture an occupant riding in a driver's seat, an assistant's seat, or an occupant's seat to obtain an occupant image and may provide the obtained occupant image to the processor 1300. The camera 1100 may include one camera or a plurality of cameras.

The camera 1100 may include an image sensor, such as a complementary metal-oxide semiconductor (CMOS), a charge-coupled device (CCD), or an activated pixel sensor, and a lens including at least one of a straight lens, a concave lens, a convex lens, a wide-angle lens, or a fish-eye lens. The camera 1100 may be analog or digital. According to an embodiment, the camera 1100 may include an infrared illuminance output device. According to another embodiment, the camera 1100 may be arranged in a predetermined area of a vehicle, for example, on an upper end of a dashboard, a rear-view mirror, a gauge, or a cluster. However, a location in which the camera 1100 is arranged is not limited to the examples described above.

The sensor 1200 may determine the number of occupants getting on or off the vehicle 100 (see FIG. 1) to count the number of occupants. The sensor 1200 may provide information about the counted number of occupants to the processor 1300. The sensor 1200 may include the infrared sensor 1210 and the seat sensor 1220.

The infrared sensor 1210 may detect the occupants by using infrared rays and may count the number of detected occupants. The infrared sensor 1210 may include a light outputter configured to output a plurality of infrared rays or a plurality of image sensors. The infrared sensor 1210 may detect the occupants by using a time of flight (TOF) scheme, a structured light scheme, or a disparity scheme. The infrared sensor 1210 may be arranged, for example, adjacent to a door of the vehicle 100, and may count the number of occupants by tracking the number of persons getting on or off the vehicle through the door. The infrared sensor 1210 may provide information about the counted number of occupants to the processor 1300.

The seat sensor 1220 may be arranged in a seat 120 (see FIG. 1) of the vehicle 100. When the seat 120 includes a plurality of seats, a plurality of seat sensors 1220 may be respectively arranged in the plurality of seats 120. The seat sensor 1220 may recognize whether or not an occupant is seated, by recognizing pressure applied from the seat 120. The seat sensor 1220 may be configured, for example, as a pressure sensor. According to another embodiment, when the pressure applied from the seat 120 exceeds a predetermined threshold pressure, the seat sensor 1220 may recognize that occupants are seated and may count the number of recognized occupants. The seat sensor 1220 may provide information about the counted number of occupants to the processor 1300.

The short-range wireless communication module 1230 may perform short-range wireless communication with the mobile device 20 (see FIG. 1) of a user getting on or off the vehicle. The short-range wireless communication module 1230 may include a near-field communication (NFC) tagging module 1232 and an RFID module 1234.

The NFC tagging module 1232 may obtain information about the number of occupants getting on or off the vehicle 100, by counting the number of mobile devices 20, through an NFC tag with respect to the mobile device 20 of the user. The NFC tagging module 1232 may provide the obtained information about the number of occupants to the processor 1300.

The RFID module 1234 may perform RFID communication with a transportation card (for example, a bus card) or a credit card of the user and obtain information about the number of occupants getting on or off the vehicle 100. According to an embodiment, the RFID module 1234 may perform short-range wireless communication with the mobile device 20 through an RFID tag included in the mobile device 20 of the user. According to another embodiment, the RFID module 1234 may count the number of occupants by obtaining, by using a wireless frequency, data stored in a tag or a label stored in a transportation card, a credit card, or the mobile device 20. The RFID module 1234 may provide information about the number of occupants to the processor 1300.

The processor 1300 may execute one or more instructions of a program stored in the memory 1400. The processor 1300 may include hardware components configured to perform arithmetic, logic, and input and output operations and signal processing. The processor 1300 may include, for example, at least one from among a CPU, a microprocessor, a graphic processing unit, application specific integrated circuits (ASICs), digital signal processors (DSPs), digital signal processing devices (DSPDs), programmable logic devices (PLDs), and field programmable gate arrays (FPGAs), but the processor 1300 is not limited thereto. According to another embodiment, the processor 1300 may include a communication processor (CP).

According to another embodiment, the processor 1300 may include a dedicated hardware chip performing AI training.

The memory 1400 may include, for example, a flash memory type, a hard disk type, a multimedia card micro type, a card-type memory (for example, secure digital (SD) or extreme digital (XD) memory), a nonvolatile memory including at least one of read-only memory (ROM), electrically erasable programmable read-only memory (EEPROM), and programmable read-only memory (PROM), and a volatile memory, such as random-access memory (RAM) or static random-access memory (SRAM).

The memory 1400 may store instructions, a data structure, and program code which may be read by the processor 1300. According to an embodiment described hereinafter, the processor 1300 may be implemented to execute instructions or codes of the program stored in the memory 1400.

The memory 1400 may include instructions or program code with respect to an object detection model 1410, a data training model 1420, and a data recognition model 1430.

The object detection model 1410 is configured to recognize an object from an image obtained through the camera 1100. According to another embodiment, the object detection model 1410 may be configured to recognize an occupant from an occupant image, by using an AI model including a well-known image processing algorithm or deep learning. According to an embodiment, the object detection model 1410 may be configured to recognize an occupant from an occupant image through training using a convolution neural network (CNN) model including a pre-trained model parameter. The object detection model 1410 may recognize, for example, at least one of a face, hair, clothing, and a posture of the occupant.

The object detection model 1410 may be configured to recognize the occupant from the occupant image through the CNN model by using the pre-trained model parameter. For example, the object detection model 1410 may detect a face of a human being from the occupant image through a large volume of data sets, for example, CASIA-WebFace, VGG-Face/VGGFace 2, or MS-Celeb-1M. According to an embodiment, the object detection model 1410 may include MobileNET that is pre-trained to perform face recognition by using a VGGFace 2 data set.

However, the object detection model 1410 is not limited to the configuration of recognizing the occupant by using the scheme or algorithm described above. According to another embodiment, the object detection model 1410 may be configured to recognize an occupant from an occupant image by using an AI model including at least one of a recurrent neural network (RNN) model, a support vector machine (SVM), linear regression, logistic regression, Naive Bayes classifiers, random forest, a decision tree, or k-nearest neighbor algorithm.

According to another embodiment, the object detection model 1410 may be configured to obtain information about a coordinate value of the occupant or a face of the occupant recognized from the occupant image and display a bounding box based on the information about the coordinate value. This aspect is to be described in detail with reference to FIG. 6.

The data training model 1420 may be an AI model configured to perform training by applying a plurality of pre-obtained images as an input and applying a label value as an output. According to an embodiment, the data training model 1420 may obtain a model parameter by performing training applying a plurality of pre-obtained occupant images as an input and applying a label value with respect to an operation pattern as an output. The data training model 1420 may be configured as a DDN. The data training model 1420 may be configured as an AI model including, for example, at least one of a CNN model, an RNN model, an SVM, linear regression, logistic regression, Naive Bayes classifiers, random forest, a decision tree, or a k-nearest neighbor algorithm.

When the data training model 1420 is configured as the CNN model, the data training model 1420 may include, for example, a plurality of convolution layers having a feature vector value obtained through a convolution operation using a filter, a pooling layer pooling a value of the convolution layer, a fully connected layer connecting a plurality of layers, and the like. Aspects about the data training model 1420 are to be described in detail with reference to FIG. 8.

The data recognition model 1430 is configured to recognize data by using a DNN model including the model parameter pre-trained by the data training model 1420. According to another embodiment, the data recognition model 1430 may be configured to obtain the occupant image obtained through the camera 1100 as input data and perform training using the DNN model to output the label value with respect to the operation pattern from the obtained input data. The processor 1300 may recognize the operation pattern of the occupant included in the occupant image, through the label value output from the data recognition model 1430.

The data recognition model 1430 may be configured as an AI model including, for example, at least one of a CNN model, an RNN model, an SVM, linear regression, logistic regression, Naive Bayes classifiers, random forest, a decision tree, or a k-nearest neighbor algorithm. Aspects about the data recognition model 1430 are to be described in detail with reference to FIG. 9.

In FIG. 2, the data training model 1420 and the data recognition model 1430 are illustrated as a set of instructions or software modules stored in the memory 1400, but the data training model 1420 and the data recognition model 1430 are not limited thereto. According to another embodiment, at least one of the data training model 1420 and the data recognition model 1430 may be formed as at least one hardware chip and mounted on the electronic device 1000. For example, at least one of the data training model 1420 and the data recognition model 1430 are manufactured as an AI-dedicated hardware chip or as part of a previous general-purpose processor (e.g., a CPU or an application processor) or a graphics-dedicated processor (e.g., a graphics processing unit (GPU)) and mounted on the electronic device 1000.

According to another embodiment, the data training model 1420 and the data recognition model 1430 may be mounted on another device or a server, rather than the electronic device 1000. For example, one of the data training model 1420 and the data recognition model 1430 are included in the electronic device 1000, and the other may be included in the server. Also, the data training model 1420 and the data recognition model 1430 may connected with each other by wire or wirelessly and may provide model parameter information formed by the data training model 1420 to the data recognition model 1430 or provide data that is input into the data recognition model 1430 to the data training model 1420 as additional training data.

The processor 1300 may recognize the occupants from the occupant image and count the number of occupants, by using an instruction or a program code associated with the object detection model 1410. The processor 1300 may recognize the operation pattern of the occupants from the occupant image, by using an instruction or a program code associated with the data recognition model 1430. For example, the processor 1300 recognizes an operation pattern in which an occupant included in the occupant image uses the mobile device 20 (see FIG. 1) or gazes at the mobile device 20.

The communication interface 1500 may be connected with the base station and configured to transmit and receive data to and from the base station. According to another embodiment, the communication interface 1500 may be wirelessly connected with the mobile device 20 (see FIG. 1) of the occupant riding in the vehicle 100 (see FIG. 1) and may perform a communication relay function relaying data communication with the mobile device 20.

The communication interface 1500 may include at least one of an antenna for performing wireless data communication, an RF circuit for realizing at least one communication protocol, and an RF device. According to another embodiment, the communication interface 1500 may include at least one external antenna for performing wireless communication with the base station and at least one internal antenna for performing wireless communication with the mobile device 20 of the occupant in the vehicle.

The communication interface 1500 may select any one of a plurality of communication protocols according to control by the processor 1300. According to another embodiment, the communication interface 1500 may include a 5G mmWave communication module 1510, a 5G Sub 6 communication module 1520, an LTE communication module 1530, and a 3G mobile communication module 1540.

The processor 1300 may obtain communication access information including information about the number of mobile devices 20 accessing the communication interface 1500 and a use amount of data transmitted and received by the mobile device 20 to and from the base station by using the communication interface 1500 as a communication relay. The processor 1300 may predict a data throughput to be transmitted and received through the communication interface 1500, by using information about the number of occupants and the operation pattern of the occupants recognized from the occupant image and the communication access information. The processor 1300 may calculate a sum of the number of connectors currently accessing the communication interface 1500 and the number of predicted connectors predicted from the operation pattern of the occupants recognized from the occupant image and may multiply the calculated number of connectors and predicted connectors by a current amount of data use, to calculate the predicted data throughput. According to another embodiment, the processor 1300 may calculate the predicted data throughput by further adding the amount of data use for autonomous driving of a vehicle and the amount of data use required for high-resolution map data (e.g., an HD map) or an OTA-based update of a vehicle OS to the data throughput calculated by multiplying the number of connectors and predicted connectors by the current amount of data use.

The processor 1300 may configure the communication interface 1500 to transmit and receive data to and from the base station by using a first communication scheme including any one of the 5G Sub 6 communication module 1520, the LTE communication module 1530, and the 3G mobile communication module 1540. The processor 1300 may determine, based on the predicted data throughput, whether or not to change the first communication scheme used and configured as a default setting to a second communication scheme using the 5G mmWave communication module 1510. According to another embodiment, the processor 1300 may compare the predicted data throughput with a predetermined threshold value and may determine, based on a result of the comparing, whether or not to change the first communication scheme to the second communication scheme. The predetermined threshold value may be, for example, a maximum data throughput of the 5G Sub 6 communication scheme 1500-2, but is not limited thereto.

For example, when the predicted data throughput exceeds the predetermined threshold value, the processor 1300 determines to switch to the second communication scheme using the 5G mmWave communication module 1510. In this case, the processor 1300 may control the communication interface 1500 to perform data transmission and reception with the base station by using the 5G mmWave communication module 1510.

As another example, when the predicted data throughput is less than or equal to the predetermined threshold value, the processor 1300 determines to maintain the first communication scheme using any one of the 5G Sub 6 communication module 1520, the LTE communication module 1530, and the 3G mobile communication module 1540. In this case, the processor 1300 may control the communication interface 1500 to perform data transmission and reception with the base station by using any one of the 5G Sub 6 communication module 1520, the LTE communication module 1530, and the 3G mobile communication module 1540 used as a default setting.

According to another embodiment of the disclosure, at least one of the operations performed by the processor 1300 may be performed by using an AI technique. The at least one operation performed by using the AI technique is to be described in detail, hereinafter, with reference to FIG. 11.

When the communication interface 1500 performs a communication relay function, the communication interface 1500 may transmit and receive data to and from the mobile device 20 based on a D2D scheme. For example, the communication interface 1500 performs connection with the mobile device 20 through at least one of communication schemes including Wifi direct, mobile Bluetooth, LTE-D2D, and 5G D2D and may transmit and receive data to and from the mobile device 20. According to another embodiment, the communication interface 1500 may transmit the data received from the base station to the mobile device 20 through a downlink of communication connection between devices and transmit the data received from the mobile device 20 to the base station through an uplink.

Figure 3:
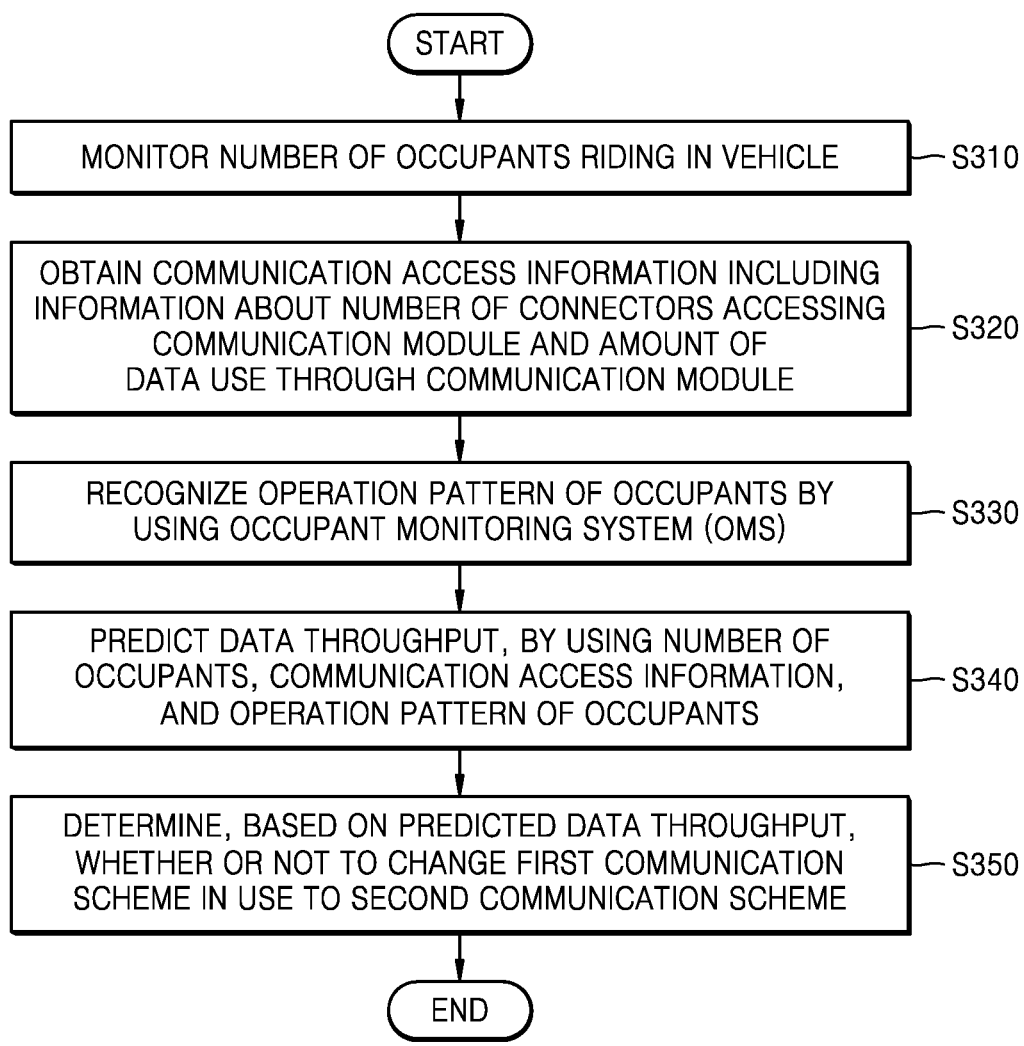
FIG. 3 is a flowchart of an operating method of an electronic device, according to an embodiment of the disclosure.

FIG. 3 is a flowchart of an operating method of an electronic device, according to an embodiment of the disclosure.

Referring to FIG. 3, in operation S310, the electronic device 1000 may monitor the number of occupants getting on a vehicle. According to an embodiment, the electronic device 1000 may monitor the number of occupants by counting the number of occupants getting on or off the vehicle, by using at least one of an infrared sensor, an NFC, and RFID.

The infrared sensor may be arranged, for example, adjacent to a door of the vehicle and may count the number of occupants by tracking the number of persons getting on or off the vehicle through the door. The infrared sensor may detect the occupants through a TOF scheme, a structured light scheme, or a disparity scheme.

According to another embodiment, the electronic device 1000 may recognize whether or not a seat is seated, by using a seat sensor included in the seat of the vehicle. The seat sensor may recognize whether or not an occupant is seated, by recognizing pressure applied from the seat by the occupant. The seat sensor may be configured, for example, as a pressure sensor. According to another embodiment, when the pressure applied from the seat exceeds a predetermined threshold pressure, the seat sensor 1220 may recognize that occupants are seated and may count the number of recognized occupants. The electronic device 1000 may monitor the number of occupants in real time through the seat sensor.

According to another embodiment, the electronic device 1000 may obtain an occupant image by capturing occupants riding in the vehicle by using a camera, and may recognize occupants from the occupant image by using an object detection model. The electronic device 1000 may monitor the number of occupants by counting the number of occupants recognized from the occupant image. According to another embodiment, the electronic device 1000 may recognize the occupants or faces of the occupants from the occupant image, by using a well-known image processing algorithm or a DNN model including a pre-trained model parameter.

In operation S320, the electronic device 1000 may obtain communication access information including information about the number of connectors accessing a communication module and the amount of data use through the communication module. According to another embodiment, the electronic device 1000 may perform data communication with a base station by using a first communication scheme including any one of a 5G Sub 6 communication module, an LTE communication module, and a 3G mobile communication module and may obtain information about the number of mobile devices 20 accessing the communication module, from among the mobile devices 20 (see FIG. 1) of the occupants, and the amount of data use through the mobile devices 20.

In operation S330, the electronic device 1000 may recognize an operation pattern of the occupants by using an OMS. According to an embodiment, the OMS may include a camera and a DNN model including a pre-trained model parameter. The DNN model may be configured as an AI model including, for example, at least one of a CNN model, an RNN model, an SVM, linear regression, logistic regression, Naive Bayes classifiers, random forest, a decision tree, or a k-nearest neighbor algorithm The electronic device 1000 may perform a training operation by inputting the occupant image obtained by the camera into the DNN model as input data in order to obtain a label value with respect to the operation pattern of the occupants. The electronic device 1000 may recognize the operation pattern of the occupants based on the obtained label value. The electronic device 1000 may recognize, for example, an operation pattern in which the occupant uses the mobile device 20, an operation pattern in which the occupant 10 gazes at the mobile device 20, an operation pattern in which the occupant 10 takes a sleep, or an operation pattern in which the occupant 10 converses with a person next to the occupant 10.

In operation S340, the electronic device 1000 may predict a data throughput by using the number of occupants, the communication access information, and the operation pattern of the occupants. The electronic device 1000 may calculate a sum of the number of connectors currently accessing the communication module and the number of predicted connectors predicted from the operation pattern of the occupants recognized from the occupant image and may multiply the calculated sum of the number of connectors and the number of predicted connectors by a current amount of data use, to calculate the predicted data throughput. According to another embodiment, the electronic device 1000 may calculate the predicted data throughput by further adding the amount of data use for autonomous driving of a vehicle and the amount of data use required for high-resolution map data (e.g., an HD map) or an OTA-based update of a vehicle OS to the data throughput calculated by multiplying the number of connectors and predicted connectors by the current amount of data use.

In operation S350, the electronic device 1000 may determine, based on the predicted data throughput, whether or not to switch from a first communication scheme that is previously used to a second communication scheme. According to another embodiment, the electronic device 1000 may compare the predicted data throughput with a predetermined threshold value and may determine, based on a result of the comparing, whether to maintain the first communication scheme previously used or to switch to the second communication scheme using the 5G mmWave communication. Operation S350 is to be described in detail with reference to FIG. 4.

Figure 4:
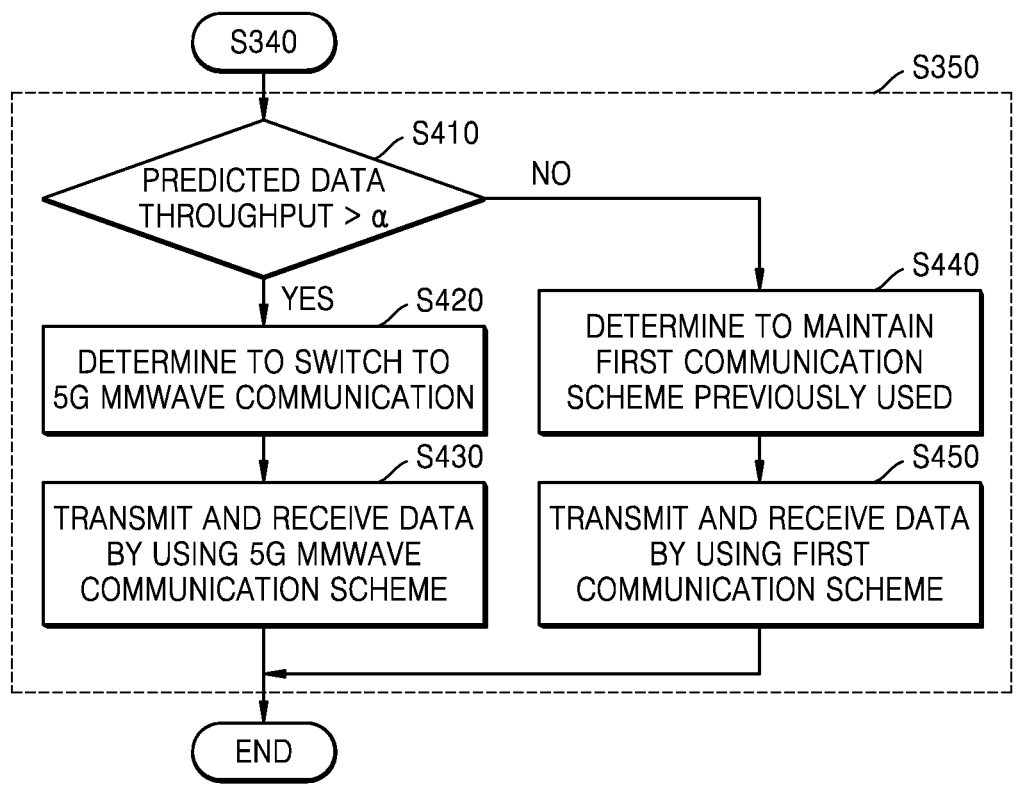
FIG. 4 is a flowchart of an operating method of an electronic device, according to an embodiment of the disclosure.

FIG. 4 is a flowchart of an operating method of an electronic device, according to an embodiment of the disclosure.

Referring to FIG. 4, operations S410 to S450 illustrated referring to FIG. 4 are detailed operations of operation S350 illustrated in FIG. 3. Operation S410 illustrated in FIG. 4 may be performed after operation S340 of FIG. 3 is performed.

In operation S410, the electronic device 1000 may compare the predicted data throughput with a predetermined threshold value α. Here, the "predetermined threshold value α" may be, for example, a maximum data throughput of the 5G Sub 6 communication scheme. However, it is not limited thereto, and the predetermined threshold value α may be a maximum data throughput of the LTE communication scheme or a maximum data throughput of the 3G mobile communication.

When the predicted data throughput exceeds the predetermined threshold value α (operation S420), the electronic device 1000 may change the first communication scheme previously used to 5G mmWave communication.

In operation S430, the electronic device 1000 may transmit and receive data by using the 5G mmWave communication scheme. According to an embodiment, the processor 1300 (see FIG. 2) of the electronic device 1000 may control the communication interface 1500 (see FIG. 2) to transmit and receive data to and from the base station by using the 5G mmWave communication module 1510 (see FIG. 2).

The electronic device 1000 may perform a communication relay function for a mobile device of an occupant in the vehicle by using the 5G mmWave communication scheme. According to another embodiment, by using the 5G mmWave communication module 1510, the communication interface 1500 may transmit data received from the base station to the mobile device of the occupant through a downlink of communication connection between devices and transmit data received from the mobile device to the base station through an uplink.

When the predicted data throughput is less than or equal to the predetermined threshold value α (operation S440), the electronic device 1000 may determine to maintain the first communication scheme previously used. According to another embodiment, the electronic device 1000 may perform data communication with the base station by using, as a default setting, the first communication scheme including any one of 5G Sub 6, LTE, and 3G mobile communication. When the predicted data throughput is less than or equal to the predetermined threshold value α, the electronic device 1000 may maintain the first communication scheme.

In operation S450, the electronic device 1000 may transmit and receive data by using the first communication scheme. According to another embodiment, the processor 1300 may control the communication interface 1500 to transmit and receive data to and from the base station by using the first communication scheme including any one of the 5G Sub 6 communication module 1520, the LTE communication module 1530, and the 3G mobile communication module 1540. According to an embodiment, by using any one of the 5G Sub 6 communication module 1520, the LTE communication module 1530, and the 3G mobile communication module 1540, the communication interface 1500 may transmit data received from the base station to the mobile device of the occupant through a downlink of communication connection between devices and transmit data received from the mobile device to the base station through an uplink.

Figure 5:
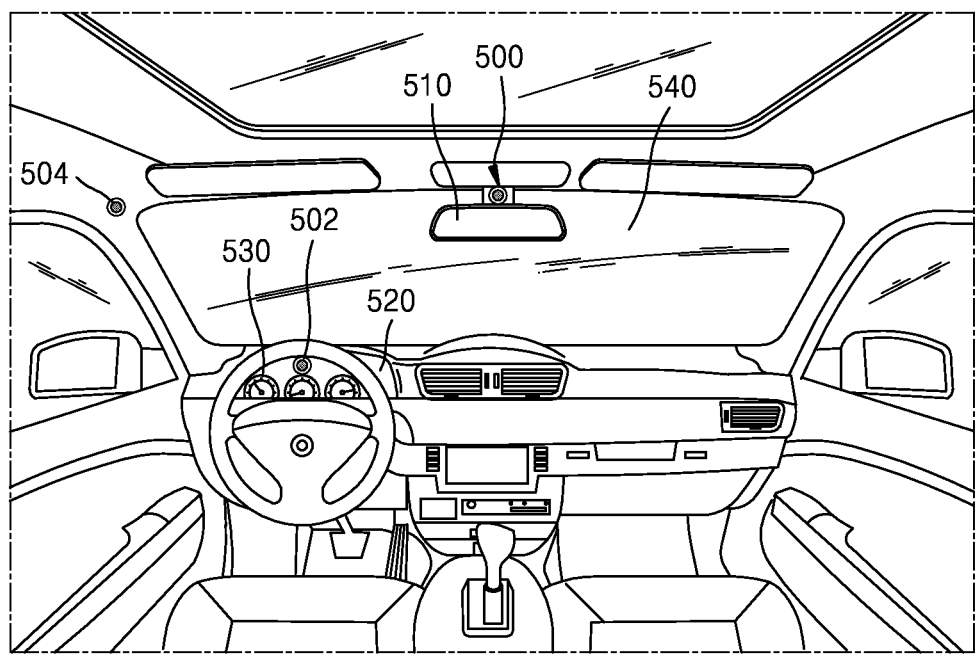
FIG. 5 is a diagram showing an inner space of a vehicle to describe a structure of an occupant monitoring system (OMS), according to an embodiment of the disclosure.

FIG. 5 is a diagram showing an inner space of a vehicle for describing a structure of an OMS, according to an embodiment of the disclosure.

The OMS may include at least one of cameras 500, 502, and 504, the object detection model 1410 (see FIG. 2), the data training model 1420 (see FIG. 2), and the data recognition model 1430. Referring to FIG. 5, the cameras 500, 502, and 504 may be arranged on an upper end of a rear-view mirror 510, a dashboard 520, or a cluster 530 in the vehicle or around a front window 540. For example, a first camera 500 is arranged on the rear-view mirror 510, a second camera 502 may be arranged on the upper end of the cluster 530, and the third camera 504 may be arranged adjacent to the front window 540. However, locations at which the cameras 500, 502, and 504 are arranged are not limited to the examples described above.

It is illustrated in FIG. 5 that the cameras 500, 502, and 504 are provided in a plural number, but it is not limited thereto. According to another embodiment, the OMS may include only one camera.

The cameras 500, 502, and 504 may include at least one image sensor (for example, a front sensor or a rear sensor), a lens, an image signal processor (ISP), or a flash (for example, a light-emitting diode (LED) or a xenon lamp).

The cameras 500, 502, and 504 may obtain an occupant image by capturing at least one of a driver of the vehicle and an occupant riding in the seat. For example, the cameras 500, 502, and 504 may obtain the occupant image by capturing the occupant and provide the obtained occupant image to the processor 1300 (see FIG. 2). The processor 1300 may recognize occupants from the occupant image and monitor the number of recognized occupants, by using instructions or a program code related to the object detection model 1410. An embodiment in which the processor 1300 recognizes the occupants from the occupant image is to be described in detail with reference to FIG. 6.

The processor 1300 may recognize an operation pattern of the occupants from the occupant image, by using instructions or a program code related to the data training model 1420 and the data recognition model 1430. A specific embodiment in which the processor 1300 recognizes the operation pattern of the occupants from the occupant image is to be described in detail with reference to FIG. 7.

Figure 6:
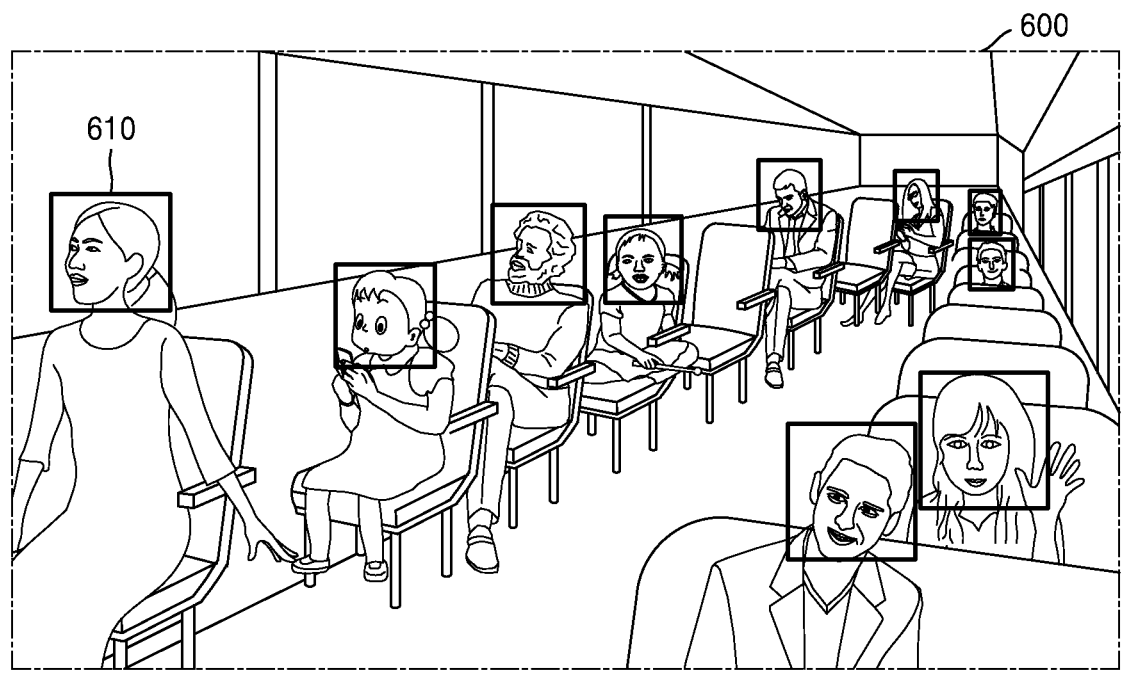
FIG. 6 is a diagram for describing a method, performed by an electronic device, of recognizing an occupant from an image, according to an embodiment of the disclosure.

FIG. 6 is a diagram for describing a method, performed by an electronic device, of recognizing an occupant from an image, according to an embodiment of the disclosure.

Referring to FIG. 6, the processor 1300 (see FIG. 2) may recognize occupants from an occupant image 600 obtained from a camera and display a bounding box 610 at a recognized portion of the image. According to an embodiment, the processor 1300 may recognize the occupants from the occupant image 600, by using the instructions or the program code related to the object detection model 1410 (see FIG. 2). The object detection model 1410 may be configured to recognize the occupants from the occupant image by using an AI model including a well-known image processing algorithm or deep learning. According to another embodiment, the object detection model 1410 may be configured to recognize the occupants from the occupant image through a training operation using a CNN model including a pre-trained model parameter.

According to an embodiment, the object detection model 1410 may be configured to recognize faces of the occupants from the occupant image 600 through the CNN model by using the pre-trained model parameter. For example, the object detection model 1410 is configured to detect a face of a human being from the occupant image 600 through a large volume of data sets, for example, CASIA-WebFace, VGG-Face/VGGFace 2, or MS-Celeb-1M. According to an embodiment, the object detection model 1410 may include MobileNET that is pre-trained to perform face recognition by using a VGGFace 2 data set.

However, the object detection model 1410 is not limited to the operation of recognizing the occupants by using the scheme or algorithm described above. According to another embodiment, the object detection model 1410 may be configured to recognize the faces of the occupants from the occupant image 600 by using an AI model including at least one of an RNN model, an SVM, linear regression, logistic regression, Naive Bayes classifiers, random forest, a decision tree, or k-nearest neighbor algorithm.

The processor 1300 may display the bounding box 610 at the portion of the image corresponding to the face of the occupant recognized by using the object detection model 1410.

The processor 1300 may count the number of bounding boxes 610 and, based on the number of bounding boxes 610, monitor the number of occupants. According to another embodiment, when the camera provides a video by capturing a plurality of occupant image frames according to time, the processor 1300 may recognize occupants from the plurality of occupant image frames and monitor the number of occupants in real time.

Figure 7:
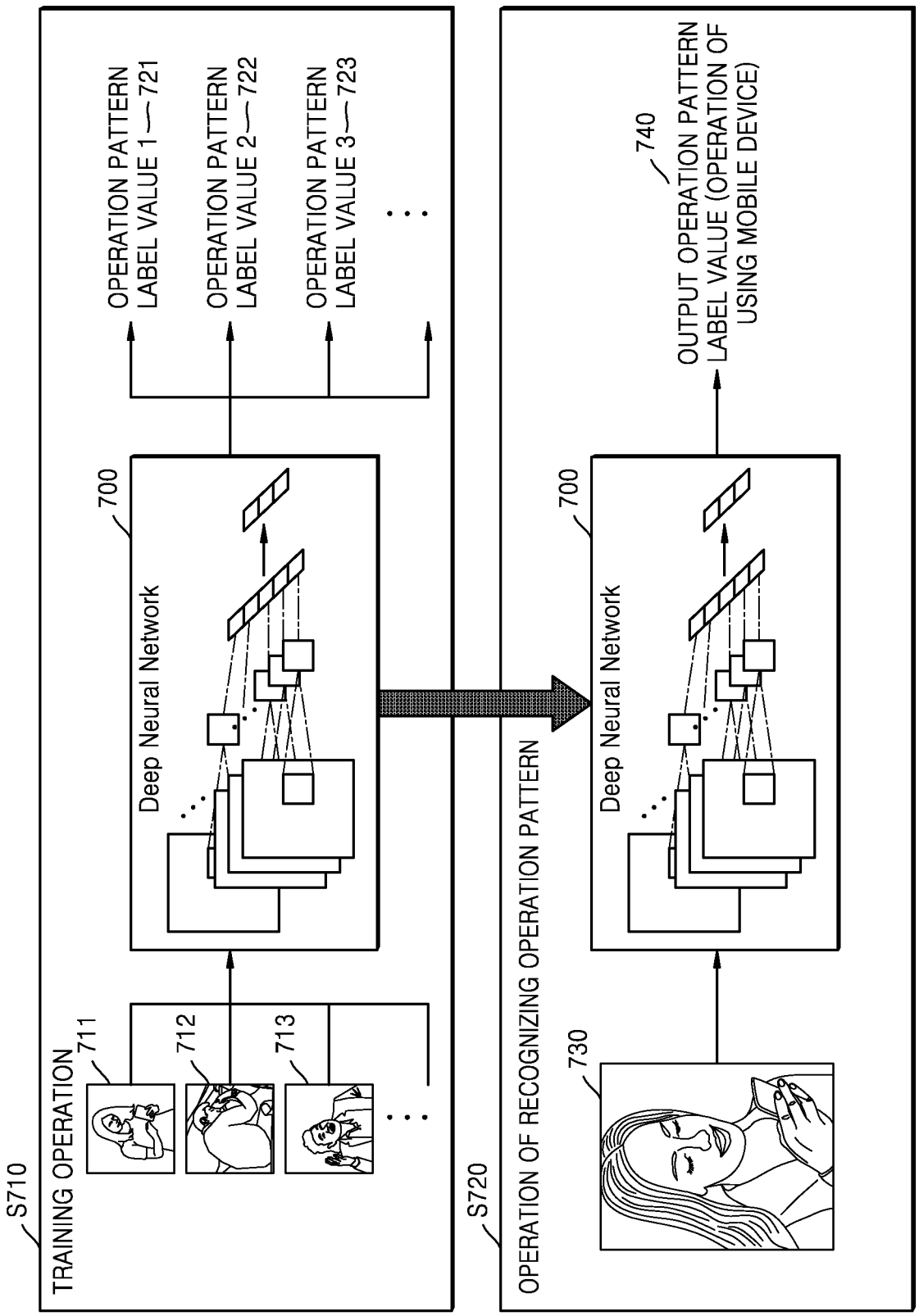
FIG. 7 is a diagram showing a method, performed by an electronic device, of recognizing an operation pattern from an image, by using a deep neural network (DNN), according to an embodiment of the disclosure.

FIG. 7 is a diagram showing a method, performed by an electronic device, of recognizing an operation pattern from an image, by using a DNN model, according to an embodiment of the disclosure.

Referring to FIG. 7, an operation in which the electronic device 1000 recognizes the operation pattern from the image may include two operations. Operation S710 is a training operation in which the electronic device 1000 obtains a model parameter by training using a plurality of images 711 to 713, and operation S720 is an operation in which the electronic device 1000 recognizes an operation pattern from an image 730 by using the pre-trained model parameter.

The processor 1300 (see FIG. 2) of the electronic device 1000 may perform the training operation with respect to the DNN model 700 by using instructions or a program code related to the data training model 1420 (see FIG. 2). The DNN model 700 may include a plurality of hidden layers, which are internal layers performing an operation. The DNN model 700 may include, for example, at least one of a CNN model, an RNN model, a restricted Boltzmann machine (RBM), a deep belief network (DBN), a bidirectional recurrent deep neural network (BRDNN), and deep Q-networks. However, the DNN model 700 is not limited to the examples described above.

In the training operation (i.e., operation S710), the processor 1300 may perform the training operation with respect to the model parameter of the DNN model 700, by applying the plurality of pre-obtained images 711 to 713 to the DNN model 700 as an input and applying operation pattern label values 721 to 723 respectively corresponding to the plurality of images 711 to 713 as an output. For example, through the training operation in which a first operation pattern label value 721 with respect to an operation of using a mobile device or gazing at the mobile device is applied in the case of a first image 711, a second operation pattern label value 722 with respect to an operation of taking a sleep is applied in the case of a second image 712, and a third operation pattern label value 723 with respect to an operation of conversing with a next person is applied in the case of a third image 713, the model parameter of the DNN model 700 may be trained.

When the DNN model 700 is a CNN, the processor 1300 may extract feature values by striding on the plurality of images 711 to 713 applied as the input, by using a filter having a predetermined size and the predetermined number of channels, obtain a plurality of layers including the extracted feature values, and apply a weight to the plurality of layers, to obtain a feature vector map, in the training operation (i.e., operation S710). In the process of obtaining the feature vector value, a rectified linear unit (ReLU) model may be used, and in order to increase the efficiency, an operation of normalizing the feature values through drop out and an operation of performing pooling or max pooling may further be added. Next, the feature values obtained through the pooling or the max pooling operation may be integrated through a fully connected layer, and the training operation may be performed to output a label value with respect to a predetermined operation pattern through a softmax operation.

In the operation of recognizing the operation pattern (i.e., operation S720), the processor 1300 of the electronic device 1000 may input the occupant image 730 obtained through the camera into the DNN model 700 including the pre-trained model parameter and may train the DNN model 700 to output an operation pattern label value 740 with respect to the occupant image 730. According to an embodiment, the processor 1300 may recognize an operation pattern in which the mobile device is used, through the output operation pattern label value 740.

Figure 8:
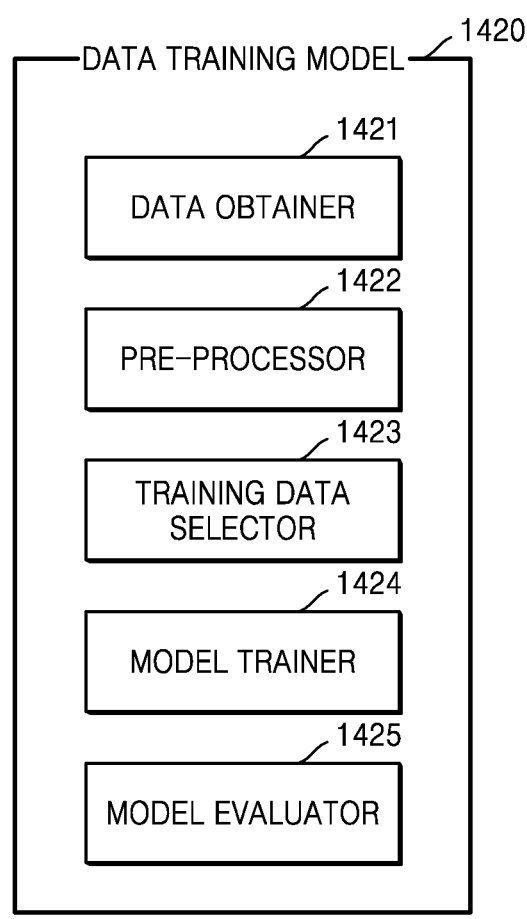
FIG. 8 is a block diagram of a data training model according to an embodiment of the disclosure.

FIG. 8 is a block diagram of a data training model according to an embodiment of the disclosure.

Referring to FIG. 8, the data training model 1420 may include a data obtainer 1421, a pre-processor 1422, a training data selector 1423, a model trainer 1424, and a model evaluator 1425.

The data obtainer 1421 may obtain data required for recognizing an operation pattern. The data obtainer 1421 may obtain image data required for a training operation for recognizing the operation pattern. According to an embodiment, the data obtainer 1421 may receive an image through a camera of the electronic device 1000 including the data training model 1420 or an external camera (for example, a closed-circuit television (CCTV) or a black box in a vehicle) capable of communicating with the electronic device 1000 including the data training model 1420. According to another embodiment, the data obtainer 1421 may receive image data through an input device of the electronic device 1000 or may obtain image data through a server communicating with the electronic device 1000.

According to another embodiment, the image data received by the data obtainer 1421 may be an occupant image including occupants in a vehicle.

The pre-processor 1422 may pre-process the obtained data to use the obtained data for the trainer for recognizing the operation pattern. The pre-processor 1422 may process the obtained data into a predetermined format so that the model trainer 1424 to be described below may use the obtained data for the training operation for recognizing the operation pattern. According to another embodiment, the pre-processor 1422 may perform a pre-processing operation that normalizes an occupant image in order to input the occupant image into the model trainer 1424. For example, the pre-processor 1422 may resize a size of the occupant image into a predetermined size appropriate for performing the training operation by using the model trainer 1424 and may adjust a scale of the occupant image.

The training data selector 1423 may select data needed for the training operation from the pre-processed data. The selected data may be provided to the model trainer 1424. The training data selector 1423 may select the data needed for the training operation from the pre-processed data, according to predetermined criteria for recognizing the operation pattern. Also, the training data selector 1423 may select the data according to criteria predetermined by the training operation by the model trainer 1424 to be described below.

The model trainer 1424 may train criteria for how to determine a situation based on the training data. Also, the model trainer 1424 may train criteria for which training data to use for recognizing the operation pattern.

Also, the model trainer 1424 may train a data recognition model used for recognizing the operation pattern, by using the training data. In this case, the data recognition model may be a pre-established model. For example, the data recognition model may be pre-established by receiving default training data (for example, a sample image, etc.) as an input.

The data recognition model may be established by taking into account an application field of the recognition model, a purpose of training, the computer performance of a device, or the like. The data recognition model may be, for example, a DNN-based model. For example, the data recognition model may include, for example, at least one of a CNN model, an RNN model, an RBM, a DBN, a BRDNN, and deep Q-networks. However, it is not limited to the examples described above.

According to another embodiment, when there are a plurality of pre-established data recognition models, the model trainer 1424 may determine a data recognition model having a relatively greater relevance between input training data and default training data, as a data recognition model to perform the training operation. In this case, the default training data may be pre-classified into types of data, and the data recognition model may be pre-established for each type of data. For example, the default training data may be pre-classified based on various criteria, such as a region in which training data is generated, a time at which the training data is generated, a volume of the training data, a genre of the training data, a generator of the training data, a type of object in the training data, etc.

Also, the model trainer 1424 may train the data recognition model by using a training algorithm, etc., including, for example, error back-propagation or gradient descent.

Also, the model trainer 1424 may train the data recognition model, for example, through supervised learning using training data as an input value. Also, the model trainer 1424 may train the data recognition model via, for example, unsupervised learning, according to which criteria for recognizing the operation pattern is discovered via direct learning of a type of data needed for recognizing the operation pattern, without additional supervision. Also, the model trainer 1424 may train the data recognition model via, for example, reinforcement learning using feedback with respect to whether a result of the recognizing of the operation pattern according to the training is correct or not.

Also, when the data recognition model is trained, the model trainer 1424 may store the trained data recognition model. In this case, the model trainer 1424 may store the trained data recognition model in the memory 1400 (see FIG. 2) of the electronic device 1000 including the data recognition model 1430. Alternatively, the model trainer 1424 may store the trained data recognition model in the memory 1400 of the electronic device 1000 including the data recognition model 1430 to be described below. Alternatively, the model trainer 1424 may store the trained data recognition model in a memory of a server connected with the electronic device 1000 by a wired or wireless network.

In this case, the memory 1400 storing the trained data recognition model may also store, for example, a command or data associated with at least another component of the electronic device 1000. Also, the memory 1400 may store software and/or a program. The program may include, for example, a kernel, middleware, an application programming interface (API), and/or an application program (or an "application").

The model evaluator 1425 may input evaluation data into the data recognition model, and when a recognition result output from the evaluation data does not satisfy a predetermined criterion, may make the model trainer 1424 perform the training operation again. In this case, the evaluation data may be data predetermined for evaluating the data recognition model.

For example, the model evaluator 1425 may evaluate that a predetermined criterion is not satisfied, when the number or a rate of pieces of evaluation data with respect to which recognition results are incorrect, exceeds a predetermined threshold value, from among recognition results of the trained data recognition model, with respect to the evaluation data. For example, when the predetermined criterion is defined as a rate of 2%, the model evaluator 1425 may evaluate that the trained data recognition model is not appropriate, when the trained data recognition model outputs wrong recognition results with respect to more than 20 pieces of evaluation data from among the total of 1,000 pieces of evaluation data.

When there are a plurality of trained data recognition models, the model evaluator 1425 may evaluate whether a predetermined criterion is satisfied with respect to each trained video recognition model and may determine a model satisfying the predetermined criterion as a final data recognition model. In this case, when there are a plurality of models satisfying the predetermined criterion, the model evaluator 1425 may determine a predetermined number of models, i.e., one or more models, as the final data recognition model, according to an order of a high evaluation score.

At least one of the data obtainer 1421, the pre-processor 1422, the training data selector 1423, the model trainer 1424, and the model evaluator 1425 in the data training model 1420 may be manufactured in the form of at least one hardware chip and mounted on the electronic device 1000. For example, at least one of the data obtainer 1421, the pre-processor 1422, the training data selector 1423, the model trainer 1424, and the model evaluator 1425 may be manufactured in the form of an AI-dedicated hardware chip or may be manufactured as part of a previous general-purpose processor (for example, a CPU or an application processor) or a graphics-dedicated processor (for example, a GPU) and mounted on various electronic devices described above.

Also, the data obtainer 1421, the pre-processor 1422, the training data selector 1423, the model trainer 1424, and the model evaluator 1425 may be mounted on one electronic device or may each separately mounted on a different electronic device. For example, some of the data obtainer 1421, the pre-processor 1422, the training data selector 1423, the model trainer 1424, and the model evaluator 1425 may be included in the electronic device 1000 and the others may be included in a server.

Also, at least one of the data obtainer 1421, the pre-processor 1422, the training data selector 1423, the model trainer 1424, and the model evaluator 1425 may be implemented as a software module. When at least one of the data obtainer 1421, the pre-processor 1422, the training data selector 1423, the model trainer 1424, and the model evaluator 1425 is implemented as a software module (or a program module including an instruction), the software module may be stored in a non-transitory computer-readable recording medium. For example, the "non-transitory storage medium" may include a buffer in which data is temporarily stored. Also, in this case, at least one software module may be provided by an OS or a predetermined application. Alternatively, some of the software modules may be provided by an OS, and the others may be provided by a predetermined application.

Figure 9:
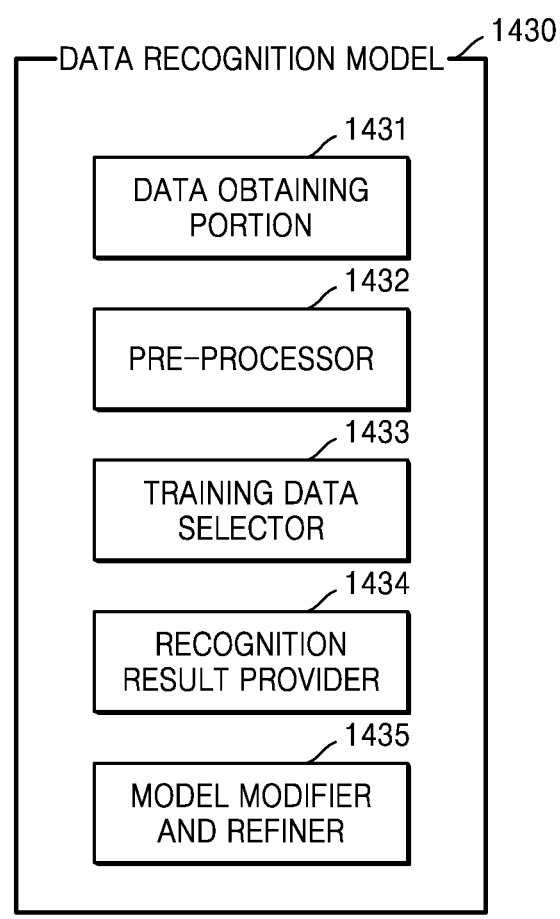
FIG. 9 is a block diagram of a data recognition model according to an embodiment of the disclosure.

FIG. 9 is a block diagram of a data recognition model according to an embodiment of the disclosure.

Referring to FIG. 9, the data recognition model 1430 may include a data obtainer 1431, a pre-processor 1432, a recognition data selector 1443, a recognition result provider 1434, and a model modifier and refiner 1435.

The data obtainer 1431 may obtain data required for recognizing an operation pattern, and the pre-processor 1432 may pre-process the data obtained for recognizing the operation pattern to use the obtained data. The data obtainer 1431 may receive an occupant image through a camera of the electronic device 1000 or an external camera (for example, a CCTV or a black box in a vehicle) capable of communicating with the electronic device 1000. According to another embodiment, the data obtainer 1431 may receive an occupant image through an input device of the electronic device 1000 or may obtain the occupant image through a server communicating with the electronic device 1000.

The pre-processor 1432 may process the obtained data into a predetermined format so that the recognition result provider 1434 to be described below may use the data obtained for recognizing the operation pattern.

The recognition data selector 1433 may select data required for recognizing the operation pattern from the pre-processed data. The selected data may be provided to the recognition result provider 1434. The recognition data selector 1433 may select part or the whole of the pre-processed data, according to a predetermined criteria for recognizing the operation pattern.

The recognition result provider 1434 may recognize the operation pattern by applying the selected data to the data recognition model. The recognition result provider 1434 may provide a recognition result according to a purpose of data recognition. The recognition result provider 1434 may use the data selected by the recognition data selector 1433 as an input value, and thus, may apply the selected data to the data recognition model. Also, the recognition result may be determined by the data recognition model.

For example, the recognition result of the operation pattern is provided as text, sound, video, an image, or an instruction (e.g., an application execution instruction, a model function execution instruction, and the like). The recognition result provider 1434 may provide a result of recognizing the operation pattern by applying the occupant image to the data recognition model.

According to an embodiment, the recognition result provider 1434 may provide a result of recognizing the operation pattern of an occupant included in the occupant image. For example, the recognition result provider 1434 provides, as the result of recognizing the operation pattern, information, such as "an operation of using a mobile device," "an operation of gazing at the mobile device," "an operation of taking a sleep," "an operation of eating," or "an operation of conversing with a next person," etc., via text, sound, video, an image, or an instruction.

The model modifier and refiner 1435 may have the data recognition model modified and refined, based on an evaluation with respect to the recognition result provided by the recognition result provider 1434. For example, the model modifier and refiner 1435 may provide the recognition result provided by the recognition result provider 1434 to the model trainer 1424, so that the model trainer 1424 may modify and refine the data recognition model.

At least one of the data obtainer 1431, the pre-processor 1432, the recognition data selector 1433, the recognition result provider 1434, and the model modifier and refiner 1435 in the data recognition model 1430 may be manufactured in the form of at least one hardware chip and mounted on the electronic device 1000. For example, at least one of the data obtainer 1431, the pre-processor 1432, the recognition data selector 1433, the recognition result provider 1434, and the model modifier and refiner 1435 are manufactured in the form of an AI-dedicated hardware chip or as part of a previous general-purpose processor (e.g., a CPU or an application processor) or a graphics-dedicated processor (e.g., a GPU) and mounted on various electronic devices described above.

Also, the data obtainer 1431, the pre-processor 1432, the recognition data selector 1433, the recognition result provider 1434, and the model modifier and refiner 1435 may be mounted on one electronic device or may each separately mounted on a different electronic device. For example, some of the data obtainer 1431, the pre-processor 1432, the recognition data selector 1433, the recognition result provider 1434, and the model modifier and refiner 1435 are included in the electronic device 1000 and the others may be included in a server.

Also, at least one of the data obtainer 1431, the pre-processor 1432, the recognition data selector 1433, the recognition result provider 1434, and the model modifier and refiner 1435 may be implemented as a software module. When at least one of the data obtainer 1431, the pre-processor 1432, the recognition data selector 1433, the recognition result provider 1434, and the model modifier and refiner 1435 is implemented as a software module (or a program module including an instruction), the software module may be stored in a non-transitory computer-readable recording medium. For example, the "non-transitory storage medium" includes a buffer in which data is temporarily stored. Also, in this case, at least one software module may be provided by an OS or a predetermined application. Alternatively, some of the software modules may be provided by an OS, and the others may be provided by a predetermined application.

Figure 10:
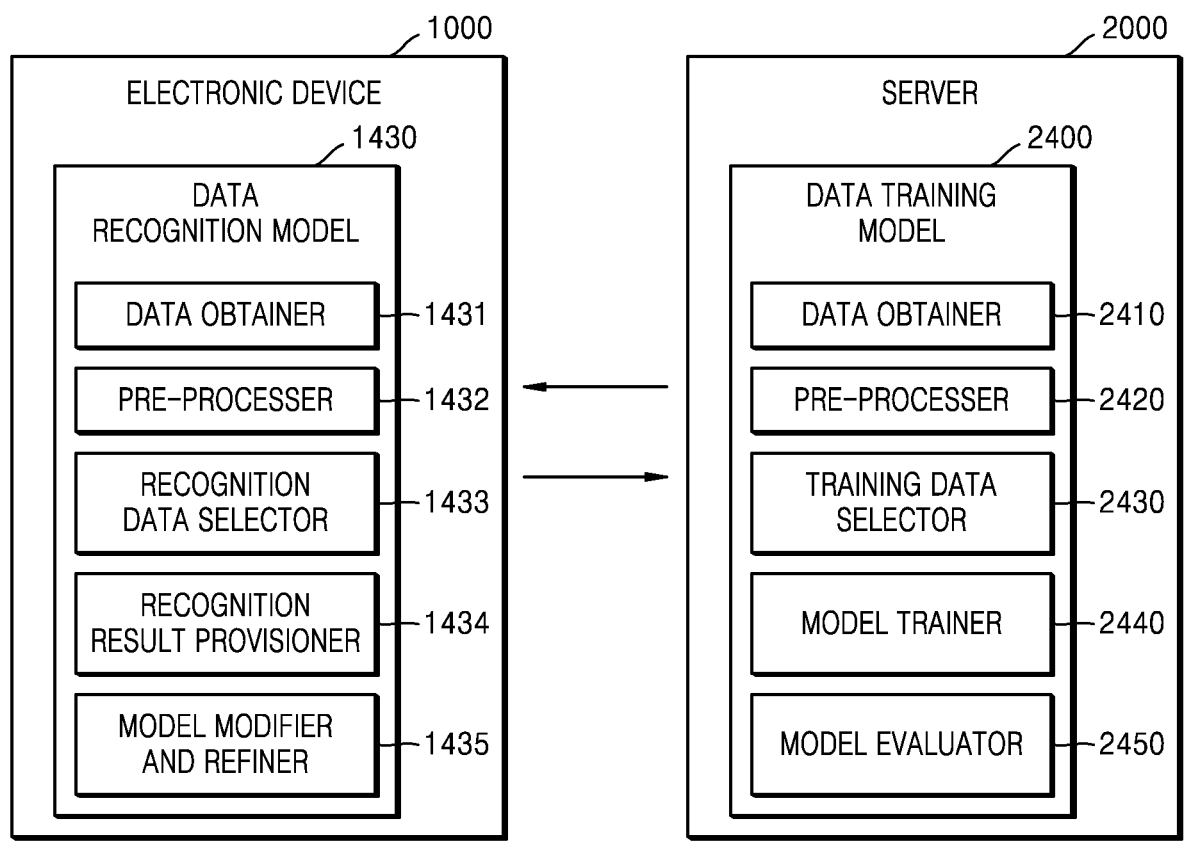
FIG. 10 is a diagram showing an embodiment in which data is trained and recognized in synchronization between an electronic device and a server, according to an embodiment of the disclosure.

FIG. 10 is a diagram showing an embodiment in which an electronic device performs a training and recognizing operation with respect to data, in synchronization with a server, according to an embodiment of the disclosure.

Referring to FIG. 10, a server 2000 may perform a training operation with respect to criteria for recognizing an operation pattern, and the electronic device 1000 may determine a situation based on a result of the training operation by the server 2000.

The electronic device 1000 may include the data recognition model 1430, and the data recognition model 1430 may include the data obtainer 1431, the pre-processor 1432, the recognition data selector 1433, the recognition result provider 1434, and the model modifier and refiner 1435.

The server 2000 may include a data training model 2400, and the data training model 2400 may include a data obtainer 2410, a pre-processor 2420, a training data selector 2430, a model trainer 2440, and a model evaluator 2450.

The model trainer 2440 included in the server 2000 may perform the same function and/or operation as the data training model 1420 illustrated in FIG. 8. The model trainer 2340 of the server 2000 may perform a training operation with respect to criteria with respect to which data to use to recognize the operation pattern from an image and how to recognize the operation pattern by using data. The model trainer 2340 may perform the training operation with respect to the criteria for recognizing the operation pattern, by obtaining data to be used for the training operation and applying the obtained data to the data recognition model described below.

Also, the recognition result provider 1434 included in the electronic device 1000 may determine a situation by applying data selected by the recognition data selector 1433 to the data recognition model generated by the server 2000. For example, the recognition result provider 1434 of the electronic device 1000 transmits the data selected by the recognition data selector 1433 to the server 2000 and may request the server 2000 to apply the data selected by the recognition data selector 1433 to the recognition model to determine the situation. Also, the recognition result provider 1434 may receive, from the server 2000, information about the situation determined by the server 2000.

Alternatively, the recognition result provider 1434 included in the electronic device 1000 may receive, from the server 2000, the recognition model generated by the server 2000, and may recognize the operation pattern by using the received recognition model. In this case, the recognition result provider 1434 of the electronic device 1000 may recognize the operation pattern by applying the data selected by the recognition data selector 1433 to the data recognition model received from the server 2000.

Figure 11:
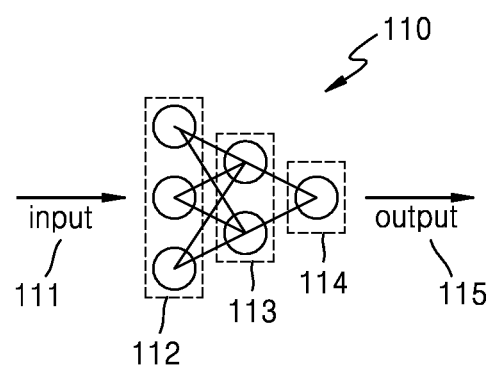
FIG. 11 is a diagram for describing an operation performed by an electronic device by using an artificial intelligence (AI) technique, according to an embodiment of the disclosure.

FIG. 11 is a diagram for describing an operation performed by using an AI technique, according to an embodiment of the disclosure.

Referring to FIG. 11, at least one of operations performed by the electronic device 1000, that is, i) an operation of monitoring the number of occupants riding in a vehicle, ii) an operation of obtaining communication access information including information about the number of connectors accessing a communication module from among the occupants and a use amount of data transmitted and received to and from a base station through the communication module, iii) an operation of recognizing an operation pattern of the occupants by using an OMS, iv) an operation of predicting a data throughput to be transmitted and received through the communication module, by using the number of occupants, the obtained communication access information, and the operation pattern of the occupants, and v) an operation of determining, based on the predicted data throughput, whether or not to switch from a first communication scheme previously used to a second communication scheme, which is 5G mmWave communication, may be performed by using the AI technique performing a neural network operation.

The artificial intelligence technique (hereinafter, the "AI technique") is a technique for obtaining a target result via processing, such as analysis and/or classification of input data, based on the neural network operation.

The AI technique may be realized by using an algorithm Here, the algorithm or a set of algorithms for realizing the AI technique is referred to as a neural network. Here, the neural network may output resultant data by receiving input data and performing the operation for analysis and/or classification described above. In order for the neural network to accurately output corresponding resultant data, it is required to train the neural network. Here, "training" may denote to train the neural network to directly discover or learn a method of analyzing pieces data input into the neural network, a method of classifying the pieces of input data, and/or a method of extracting a feature required for generating the resultant data from the pieces of input data. In detail, through the training process, the neural network may optimize weight values in the neural network via a training operation with respect to training data (e.g., a plurality of different images). Also, the input data may be processed through the neural network having the optimized weight values, and thus, the target result may be output.

When the neural network has a plurality of hidden layers, which are internal layers performing the operation, that is, when a depth of the neural network performing the operation is increased, the neural network may be classified as a DNN. Examples of the neural network may include a CNN, a DNN, an RNN, an RBM, a DBN, a BRDNN, a deep Q-network, and the like, but are not limited to thereto. Also, the neural network may be classified. For example, a CNN is classified into a deep CNN (DCNN) or a capsule network (capsnet) neural network (not shown).

An "AI model" may denote a neural network including at least one layer operating to receive input data and output a target result. Also, the "AI model" may denote an algorithm or a set of plurality of algorithms for performing an operation through a neural network and outputting a target result, a processor for executing the algorithm (or the set of algorithms), software for executing the algorithm (or the set of algorithms), or hardware for executing the algorithm (or the set of algorithms).

At least one of the operations described above, that is, i) an operation of monitoring the number of occupants riding in a vehicle, ii) an operation of obtaining communication access information including information about the number of connectors accessing a communication module from among the occupants and a use amount of data transmitted and received to and from a base station through the communication module, iii) an operation of recognizing an operation pattern of the occupants by using an OMS, iv) an operation of predicting a data throughput to be transmitted and received through the communication module, by using the number of occupants, the obtained communication access information, and the operation pattern of the occupants, and v) an operation of determining, based on the predicted data throughput, whether or not to switch from a first communication scheme previously used to a second communication scheme, which is 5G mmWave communication, may be performed based on the AI model.

Referring to FIG. 11, the neural network 110 may be trained by receiving training data. Also, the trained neural network 110 may receive input data 111 through an input 112, and the input 112, a hidden layer 113, and an output 114 may analyze the input data 111 and data transmitted from a previous layer to perform an operation for outputting output data 115. FIG. 11 illustrates that the hidden layer 113 is one layer. However, it is only an example, and the hidden layer 113 may include a plurality of layers.

According to an embodiment, the neural network 110 may be trained to recognize occupants from an occupant image obtained from a camera and count the number of recognized occupants.

According to another embodiment, the neural network 110 may be trained to recognize an operation pattern of the occupants from the occupant image obtained from the camera.

According to another embodiment, the neural network 110 may be trained to predict a data throughput, compare the predicted data throughput with a predetermined threshold value, and determine, based on a result of the comparing, whether to maintain a first communication scheme previously used or to switch to a second communication scheme using 5G mmWave communication.

According to another embodiment, a data or a program code related to the neural network 110 configured to perform at least one of the operations described above, that is, i) an operation of monitoring the number of occupants riding in a vehicle, ii) an operation of obtaining communication access information including information about the number of connectors accessing a communication module from among the occupants and a use amount of data transmitted and received to and from a base station through the communication module, iii) an operation of recognizing an operation pattern of the occupants by using an OMS, iv) an operation of predicting a data throughput to be transmitted and received through the communication module, by using the number of occupants, the obtained communication access information, and the operation pattern of the occupants, and v) an operation of determining, based on the predicted data throughput, whether or not to switch from a first communication scheme previously used to a second communication scheme, which is 5G mmWave communication, may be stored in the memory 1400 (see FIG. 2), and a training operation using the neural network 110 may be performed by the processor 1300 (see FIG. 2).

Alternatively, the neural network 110 configured to perform at least one of the operations described above, that is, i) an operation of monitoring the number of occupants riding in a vehicle, ii) an operation of obtaining communication access information including information about the number of connectors accessing a communication module from among the occupants and a use amount of data transmitted and received to and from a base station through the communication module, iii) an operation of recognizing an operation pattern of the occupants by using an OMS, iv) an operation of predicting a data throughput to be transmitted and received through the communication module, by using the number of occupants, the obtained communication access information, and the operation pattern of the occupants, and v) an operation of determining, based on the predicted data throughput, whether or not to switch from a first communication scheme previously used to a second communication scheme, which is 5G mmWave communication, may be realized in an additional device (not shown) or a processor (not shown) separate from the electronic device 1000.

The operation through the neural network 110 described above may be performed by the server 2000 (see FIGS. 12 and 13) capable of communicating with the electronic device 1000 through a wireless communication network, according to an embodiment. The communication between the electronic device 1000 and the server 2000 is to be described with reference to FIGS. 12 and 13.

Figure 12:
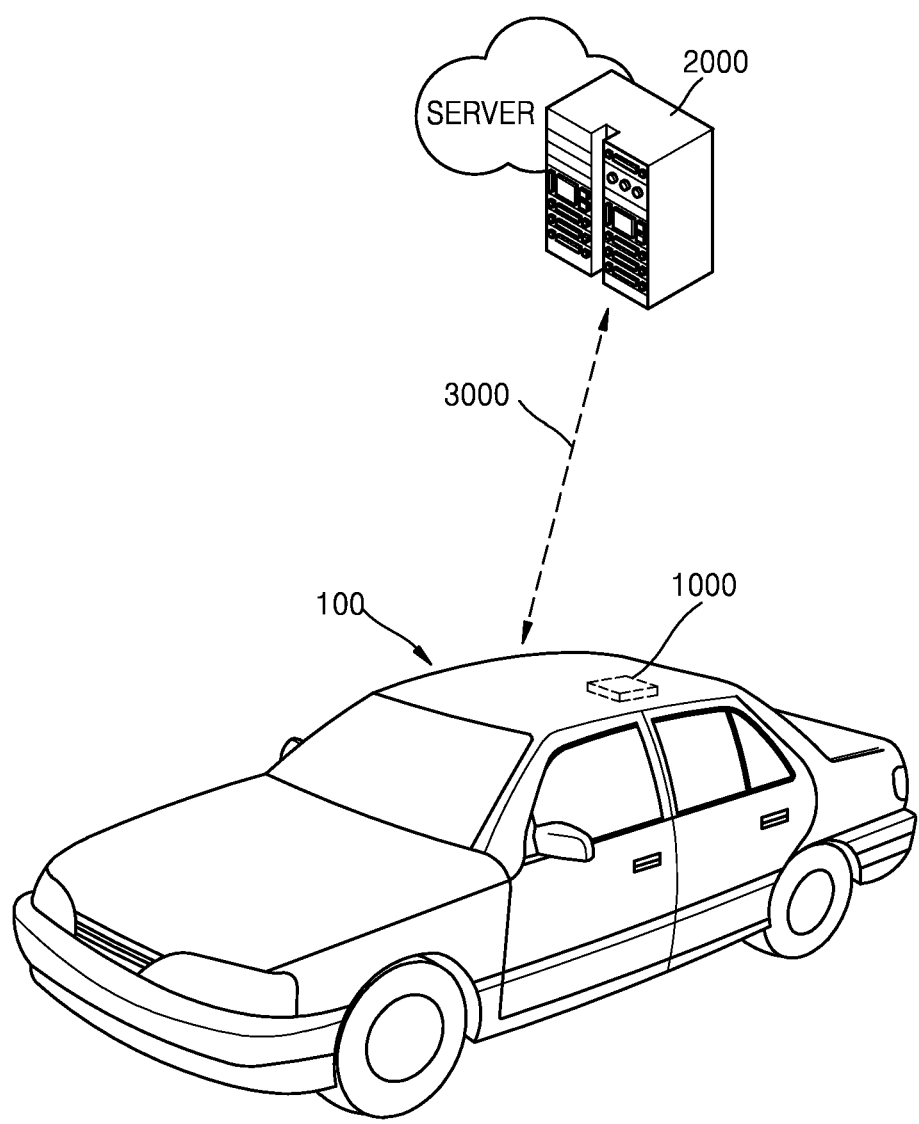
FIG. 12 is a diagram showing an embodiment in which an electronic device and a server operate in synchronization with each other, according to an embodiment of the disclosure.

FIG. 12 is a diagram of the electronic device 1000 operating in synchronization with the server 2000, according to an embodiment of the disclosure.

Referring to FIG. 12, the server 2000 may process data by transmitting and receiving the data to and from the electronic device 1000 through a communication network.

Referring to FIG. 13 together, the server 2000 may include a communicator 2100 communicating with the electronic device 1000, a processor 2200 executing at least one instruction, a database 2300, and a data training model 2400.

The server 2000 may train an AI model and store the trained AI model. Also, the server 2000 may perform, by using the trained AI model, at least one of the operations described above, that is, i) an operation of monitoring the number of occupants riding in a vehicle, ii) an operation of obtaining communication access information including information about the number of connectors accessing a communication module from among the occupants and a use amount of data transmitted and received to and from a base station through the communication module, iii) an operation of recognizing an operation pattern of the occupants by using an OMS, iv) an operation of predicting a data throughput to be transmitted and received through the communication module, by using the number of occupants, the obtained communication access information, and the operation pattern of the occupants, and v) an operation of determining, based on the predicted data throughput, whether or not to switch from a first communication scheme previously used to a second communication scheme, which is 5G mmWave communication.

In general, a memory storage capacity, an operation-processing speed, and a capability of collecting a training data set of the electronic device 1000 may be limited compared with those of the server 2000. Thus, an operation requiring storage of a large volume of data and execution of a large volume of operations may be performed by the server 2000, and then, data and/or an AI model required may be transmitted to the electronic device 1000 through a communication network. Then, even without a processor having a memory of a large capacity and a high-speed arithmetic operating capacity, the electronic device 1000 may perform a required operation rapidly and easily by receiving and using the required data and/or AI model through the server 2000.

According to an embodiment, the server 2000 may include the neural network 110 described with reference to FIG. 11.

FIG. 13 is a diagram for describing FIG. 12 in detail according to an embodiment of the disclosure.

Referring to FIG. 13, the server 2000 may include the communicator 2100, the processor 2200, the database 2300, and the data training model 2400. FIG. 13 illustrates that the data training model 2400 is a separate component from the processor 2200 and the database 2300. However, it is not limited thereto. According to an embodiment, the data training model 2400 may be formed as a software module including one or more instructions or program code, and in this case, the data training model 2400 may be included in the database 2300.

The communicator 2100 may perform communication with an external device (e.g., a server) through a wireless communication network 3000. Here, the external device (not shown) may include a server (e.g., 2000) which may perform at least one of operations required by the electronic device 1000 or may transmit data, etc. required by the electronic device 1000.

The communicator 2100 may include at least one communication module, such as a short-range wireless communication module, a wired communication module, a mobile communication module, a broadcasting reception module, etc. Here, the at least one communication module may refer to a communication module capable of performing data transmission and reception through a network according to the communication standards, such as a communication scheme using a tuner performing broadcasting reception, Bluetooth, wireless LAN (WLAN) (Wifi), wireless broadband (Wibro), world interoperability for microwave access (wimax), code division multiple access (CDMA), wideband code division multiple access (WCDMA), the Internet, 3G, 4G, 5G and/or mmwave.

For example, when the communicator 2100 performs communication using mmWave, a large volume of data is rapidly transmitted and received. In detail, the safety of a vehicle and the convenience of a user may be increased, when the vehicle rapidly receives a large volume of data by using mmWave and quickly provides data (e.g., data required for autonomous driving, data required for a navigation service, etc.) required for the safety of the vehicle 100, the user use content (e.g., movies, music, etc.), etc.

The mobile communication module included in the communicator 2100 may perform communication with another device (e.g., the server 2000) remotely located, through a communication network according to the communication standards, such as 3G, 4G, and/or 5G. Here, the communication module performing communication with the remotely located other device may be referred to as a "remote communication module."

The processor 2200 may control general operations of the server 2000. For example, the processor 2200 performs the required operations by executing one or more instructions and at least one of programs of the server 2000.

The database 2300 may include a memory (not shown) and may store at least one of one or more instructions, one or more programs, and data required for the server 2000 in the memory (not shown) to perform a predetermined operation. Also, the database 2300 may store pieces of data required for the server 2000 to perform an operation according to a neural network.

According to another embodiment, the server 2000 may store the neural network 110 described with reference to FIG. 11. The neural network 110 may be stored in at least one of the processor 2200 and the database 2300. The neural network 110 included in the server 2000 may be a neural network completely trained.

Also, the server 2000 may transmit the completely trained neural network to the communication interface 1500 of the electronic device 1000 through the communicator 2100. Then, the electronic device 1000 may obtain and store the completely trained neural network and obtain target output data through the neural network.

Programs executed by the electronic device 1000 described herein may be implemented by a hardware component, a software component, and/or a combination of a hardware component and a software component. The programs may be performed by all systems capable of executing computer-readable instructions.

The software may include a computer program, a code, an instruction, or a combination of at least two thereof, and may configure a processing device or independently or collectively instruct the processing device to operate as desired.

The software may be implemented by a computer program including an instruction stored in computer-readable storage media. Computer-readable recording media may include, for example, magnetic storage media (e.g., ROM, RAM, a floppy disc, a hard disc, etc.), optical reading media (e.g., compact disc (CD)-ROM, a digital versatile disc (DVD), etc.), etc. The computer-readable recording media may be distributed in computer systems connected through a network and may store and execute computer-readable codes in a distributed fashion. Media may be readable by a computer, stored in a memory, and executed by a processor.

The computer-readable storage media may include non-transitory storage media. Here, the term "non-transitory" of non-transitory storage media only denotes that the non-transitory storage media do not include a signal and are tangible, and does not distinguish whether the storage media semi-permanently or temporarily store the data. For example, the "non-transitory storage medium" includes a buffer in which data is temporarily stored.

Also, the program according to the embodiments of the disclosure may be included in a computer program product. The computer program product may be transacted between a seller and a purchaser, as a product.

The computer program product may include a software program or a computer-readable storage medium in which a software program is stored. For example, the computer program product includes a software program-type product (e.g., a downloadable application) electronically distributed through a manufacturer of an electronic device or an electronic market (e.g., the Google Play Store or App Store). For electronic distribution, at least a part of a software program may be stored in a storage medium or temporarily generated. In this case, the storage medium may be a storage medium of a server of the manufacturer of the electronic device 1000, a server of the electronic market, or a relay server temporarily storing the software program.

The computer program product may include a storage medium of the server 2000 or a storage medium of the electronic device in a system including the electronic device 1000, the server 2000 (see FIGS. 12 and 13), and another electronic device. Alternatively, when there is a third device (e.g., a smartphone) connected to the electronic device 1000 for communication, the computer program product may include a storage medium of the third device. Alternatively, the computer program product may directly include a software program transmitted from the electronic device 1000 to the electronic device or the third device or from the third device to the electronic device.

In this case, any one of the electronic device 1000, the electronic device, and the third device may perform the method according to the embodiments of the disclosure by executing the computer program product. Alternatively, two or more of the electronic device 1000, the electronic device, and the third device may perform the method according to the embodiments of the disclosure by executing the computer program product, in a distributed manner For example, the electronic device 1000 executes a computer program product stored in the memory 1400 (see FIG. 2) to control the other electronic device communication-connected with the electronic device 1000 to perform the method according to the embodiments.

As another example, the third device may execute the computer program product to control the electronic device communication-connected with the third device to perform the method according to the embodiments of the disclosure.

When the third device executes the computer program product, the third device may download the computer program product from the electronic device 1000 and execute the downloaded computer program product. Alternatively, the third device may execute the computer program product provided in a pre-loaded state to perform the method according to the embodiments of the disclosure.

While the disclosure has been shown and described with reference to various embodiments thereof, it will be understood by those skilled in the art that various changes in form and details may be made therein without departing from the spirit and scope of the disclosure.

What is claimed is:

1. A method performed by an electronic device mounted on a vehicle, the method comprising:
    monitoring, by the electronic device, a number of occupants riding in the vehicle;
    obtaining, by the electronic device, communication access information comprising number information and use amount information, the number information including information about a number of connectors, from among the occupants, accessing communication circuitry included in the electronic device, the use amount information including information about a use amount of data transmitted to and received from a base station through the communication circuitry;
    recognizing, by the electronic device, an operation pattern of the occupants; by using an occupant monitoring system (OMS), the operation pattern of the occupants being recognized by the electronic device based on an occupant image of the occupants riding in the vehicle;

based on the number of occupants, the communication access information, and the operation pattern of the occupants, predicting, by the electronic device, a data throughput to be transmitted and received through the communication circuitry; and , based on the predicted data throughput, determining, by the electronic device, whether to change a first communication scheme in use to a second communication scheme, the second communication scheme being fifth generation (5G) millimeter wave (mmWave) communication.

2. The method of claim 1, wherein the monitoring of the number of occupants comprises:

obtaining, by the electronic device using a camera, the occupant image by capturing, the occupants riding in the vehicle;

detecting, by the electronic device, the occupants from the occupant image via image processing or by using an object detection model; and counting, by the electronic device, a number of occupants.

3. The method of claim 1, wherein the recognizing of the operation pattern of the occupants comprises:

obtaining, by the electronic device using a camera, the occupant image by capturing; the occupants riding in the vehicle; and recognizing, by the electronic device, the operation pattern of the occupants from the occupant image by using a deep neural network (DNN) model including a pre-trained model parameter.

4. The method of claim 3, wherein the DNN model includes an artificial intelligence (AI) model obtained by training by applying a plurality of pre-obtained images as an input and applying a label value with respect to the operation pattern as an output.

5. The method of claim 1, wherein the determining of whether to change the first communication scheme comprises:

comparing, by the electronic device, the predicted data throughput with a predetermined threshold value; and , based on a result of the comparing, determining, by the electronic device, whether to maintain the first communication scheme or change the first communication scheme to the second communication scheme.

6. The method of claim 5, wherein the determining of whether to change the first communication scheme comprises:

based on the result of the comparing, indicating that the predicted data throughput is less than or equal to the predetermined threshold value, determining, by the electronic device, to continually use the first communication scheme to perform data transmission and reception, and wherein the first communication scheme comprises any one of 5G Sub 6, long term evolution (LTE), or a third generation (3G) communication scheme.

7. The method of claim 5, wherein the determining of whether to change the first communication scheme comprises:

based on the result of the comparing, indicating that the predicted data throughput exceeds the predetermined threshold value, determining, by the electronic device, to change the first communication scheme to the second communication scheme; and transmitting and receiving, by the electronic device, data by using the second communication scheme.

8. An electronic device mounted on a vehicle, the electronic device comprising:

a camera configured to obtain an occupant image by capturing occupants riding in the vehicle;

a sensor configured to obtain information regarding a number of occupants by detecting a number of human beings getting on or off the vehicle;

a communication interface configured to perform data transmission and reception by using a predetermined first communication scheme;

memory storing a program comprising one or more instructions to control the electronic device; and one or more processors communicatively coupled to the camera, the sensor, the communication interface, and the memory, wherein the one or more instructions, when executed by the one or more processors individually or collectively, cause the electronic device to:

monitor the number of occupants riding in the vehicle, by using the occupant image and the information obtained by the sensor, obtain communication access information comprising number information and use amount information, the number information including information about a number of connectors accessing the communication interface, the use amount information including information about a use amount of data transmitted to and received from a base station through the communication interface, recognize an operation pattern of the occupants, by using an occupant monitoring system (OMS), the operation pattern of the occupants being recognized by the electronic device based on the occupant image of the occupants riding in the vehicle, based on the number of occupants, the communication access information, and the operation pattern of the occupants predict a data throughput to be transmitted and received through the communication interface, and based on the predicted data throughput, determine whether to change a first communication scheme in use to a second communication scheme, is the second communication scheme being fifth generation (5G) millimeter wave (mmWave) communication.

9. The electronic device of claim 8, wherein the one or more instructions, when executed by the one or more processors individually or collectively, further cause the electronic device to:

obtain the occupant image from the camera, detect the occupants from the occupant image via image processing or by using an object detection model, and count the number of occupants.

10. The electronic device of claim 8, wherein the one or more instructions, when executed by the one or more processors individually or collectively, further cause the electronic device to;

recognize the operation pattern of the occupants from the occupant image by using a deep neural network (DNN) model including a pre-trained model parameter.

11. The electronic device of claim 10, wherein the DNN model includes an artificial intelligence (AI) model obtained by training by applying a plurality of pre-obtained images as an input and applying a label value with respect to the operation pattern as an output.

12. The electronic device of claim 8, wherein the one or more instructions, when executed by the one or more processors individually or collectively, further cause the electronic device to:
- compare the predicted data throughput with a predetermined threshold value, and
- based on a result of the comparing, determine whether to maintain the first communication scheme or change the first communication scheme to the second communication scheme.

13. The electronic device of claim 12,
wherein the one or more instructions, when executed by the one or more processors individually or collectively, further cause the electronic device to:
- based on the result of the comparing, indicating that the predicted data throughput is less than or equal to the predetermined threshold value, determine to continually use the first communication scheme to perform data transmission and reception, and wherein the first communication scheme comprises any one of 5G Sub 6, long term evolution (LTE), or a third generation (3G) communication scheme.

14. The electronic device of claim 12, wherein the one or more instructions, when executed by the one or more processors individually or collectively, further cause the electronic device to:
- based on the result of the comparing, indicating that the predicted data throughput exceeds the predetermined threshold value, determine to change the first communication scheme to the second communication scheme, and control the communication interface to transmit and receive data by using the second communication scheme.

15. A non-transitory computer program product comprising a computer-readable storage medium including instructions executed by an electronic device mounted on a vehicle, the instructions being configured to execute operations of:
- monitoring, by the electronic device, a number of occupants riding in the vehicle;
- obtaining, by the electronic device, communication access information comprising number information and use amount information, the number information including information about a number of connectors, from among the occupants, accessing communication circuitry included in the electronic device, the use amount information including information about a use amount of data transmitted to and received from a base station through the communication circuitry;
- recognizing, by the electronic device, an operation pattern of the occupants, by using an occupant monitoring system (OMS), the operation pattern of the occupants being recognized by the electronic device based on an occupant image of the occupants riding in the vehicle;
- based on the number of occupants, the communication access information, and the operation pattern of the occupants, predicting, by the electronic device, a data throughput to be transmitted and received through the communication circuitry; and
- based on the predicted data throughput, determining, by the electronic device, whether to change a first communication scheme in use to a second communication scheme, the second communication scheme being fifth generation (5G) millimeter wave (mmWave) communication.

* * * * *